US012368896B2

(12) United States Patent
Boyce et al.

(10) Patent No.: US 12,368,896 B2
(45) Date of Patent: Jul. 22, 2025

(54) METHOD, APPARATUS, AND ARTICLES OF MANUFACTURE TO GENERATE PACKED VIDEO FRAMES FOR A VOLUMETRIC VIDEO BITSTREAM AND AN IMMERSIVE VIDEO BITSTREAM

(71) Applicant: Intel Corporation, Santa Clara, CA (US)

(72) Inventors: Jill Boyce, Portland, OR (US); Basel Salahieh, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 17/926,558

(22) PCT Filed: Dec. 26, 2020

(86) PCT No.: PCT/US2020/067066
§ 371 (c)(1),
(2) Date: Nov. 18, 2022

(87) PCT Pub. No.: WO2021/257120
PCT Pub. Date: Dec. 23, 2021

(65) Prior Publication Data
US 2023/0209091 A1    Jun. 29, 2023

Related U.S. Application Data

(60) Provisional application No. 63/040,369, filed on Jun. 17, 2020.

(51) Int. Cl.
*H04N 19/70* (2014.01)
*H04N 19/172* (2014.01)
*H04N 19/597* (2014.01)

(52) U.S. Cl.
CPC ........... *H04N 19/70* (2014.11); *H04N 19/172* (2014.11); *H04N 19/597* (2014.11)

(58) Field of Classification Search
None
See application file for complete search history.

(56) References Cited

U.S. PATENT DOCUMENTS

2019/0373245 A1*  12/2019  Lee .................... H04N 21/8456
2019/0379856 A1   12/2019  Hur et al.
(Continued)

FOREIGN PATENT DOCUMENTS

EP    3562159          10/2019
EP    3562159 A1  *   10/2019  ............... G06T 9/00
(Continued)

OTHER PUBLICATIONS

International Searching Authority, "International Search Report," mailed in connection with International Patent Application No. PCT/US2020/067066, on Apr. 16, 2021, 3 pages.
(Continued)

*Primary Examiner* — James M Anderson, II
(74) *Attorney, Agent, or Firm* — Hanley, Flight & Zimmerman, LLC

(57) ABSTRACT

Methods, apparatus, systems and articles of manufacture to generate packed video frames are disclosed. A video encoding system disclosed herein includes a configuration determiner to create a packed video frame layout that includes regions into which video components are to be placed. The system also includes a frame generator to form packed video frames that include the video components placed into different regions. The encoding system further includes a frame information generator that generates packed video frame information that identifies characteristics of the packed video frame including (i) the identities of regions included
(Continued)

in the packed video frame layout, (ii) types of video components included in the regions, or iii) information identifying the locations and dimensions of the regions. A video encoder of the encoding system encodes the frames and includes the packed video frame information to signal the inclusion of the packed video frames in the encoded bitstream.

25 Claims, 22 Drawing Sheets

(56) References Cited

U.S. PATENT DOCUMENTS

| | | | |
|---|---|---|---|
| 2020/0045290 A1 | 2/2020 | Ruhm et al. | |
| 2020/0286283 A1 | 9/2020 | Takahashi | |
| 2020/0288171 A1 | 9/2020 | Hannuksela et al. | |
| 2023/0224447 A1* | 7/2023 | Ward | H04N 13/161 |
| | | | 348/43 |
| 2023/0224501 A1* | 7/2023 | Chupeau | H04N 21/2353 |
| | | | 375/240.08 |

FOREIGN PATENT DOCUMENTS

| | | |
|---|---|---|
| JP | H11313319 A | 11/1999 |
| JP | 2018078620 A | 5/2018 |
| JP | 2019054417 A | 4/2019 |
| WO | 2019006221 A1 | 1/2019 |
| WO | 2019008221 | 1/2019 |
| WO | 2019131778 A1 | 7/2019 |
| WO | 2019199415 | 10/2019 |

OTHER PUBLICATIONS

International Searching Authority, "Written Opinion," mailed in connection with International Patent Application No. PCT/US2020/067066, on Apr. 16, 2021, 7 pages.

Patent Cooperation Treaty, "International Preliminary Report on Patentability," issued in connection with International Appl. No. PCT/US2020/067066, dated Dec. 13, 2022, 8 pages.

Japanese Patent Office, "Notice of Reasons for Refusal," issued in connection with Japanese Patent Application No. 2022-561115, dated Oct. 1, 2024, 8 pages. [English Translation Included].

Japanese Patent Office, "Search Report by Registered Search Organization," issued in connection with Japanese Patent Application No. 2022-561115, dated Sep. 25, 2024, 40 pages. [English Translation Included].

"Carriage of V3C / MIV data in VVC/HEVC/AVC SEI message", JVET-U (Jan. 5, 2021), Jan. 5, 2021, 5 pages.

Japanese Patent Office, "Decision to Grant a Patent," issued in connection with Japanese Patent Application No. 2022-561115, dated Jan. 21, 2025, 5 pages. [English Translation Included].

* cited by examiner

V3C UNIT HEADER TYPES 400A

| vuh_unit_type | Identifier | V3C unit type | Description |
|---|---|---|---|
| 0 | V3C_VPS | V3C parameter set | V3C level parameters |
| 1 | V3C_AD | Atlas data | Atlas information |
| 2 | V3C_OVD | Occupancy Video Data | Occupancy information |
| 3 | V3C_GVD | Geometry Video Data | Geometry information |
| 4 | V3C_AVD | Attribute Video Data | Attribute information |
| 5 | V3C_PVD | Packed Video Data | Packed video information |
| 6...31 | V3C_RSVD | Reserved | - |

V3C UNIT HEADER 400B

| else if (vuh_unit_type type == V3C_PVD ) { | |
|---|---|
| vuh_v3c_parameter_set_id | u(4) |
| vuh_pack_index | u(4) |
| vuh_reserved_zero_9bits | u(9) |
| } | |

V3C PARAMETER SET 400C

| v3c_parameter_set( ) { | Descriptor |
|---|---|
|   profile_tier_level() | |
|   vps_v3c_parameter_set_id | u(4) |
|   vps_reserved_zero_8bits | u(8) |
|   vps_atlas_count_minus1 | u(6) |
|   for( j = 0; j < vps_atlas_count_minus1 + 1; j++ ) { | |
|     vps_atlas_id[ j ] | u(6) |
|     vps_frame_width[ j ] | u(16) |
|     vps_frame_height[ j ] | u(16) |
|     vps_map_count_minus1[ j ] | u(4) |
|     if( vps_map_count_minus1[ j ] > 0 ) | |
|       vps_multiple_map_streams_present_flag[ j ] | u(1) |
|     vps_map_absolute_coding_enabled_flag[ j ][ 0 ] = 1 | |
|     vps_map_predictor_index_diff[ j ][ 0 ] = 0 | |
|     for( i = 1; i <= vps_map_count_minus1[ j ]; i++ ) { | |
|       if( vps_multiple_map_streams_present_flag[ j ] ) | |
|         vps_map_absolute_coding_enabled_flag[ j ][ i ] | u(1) |
|       else | |
|         vps_map_absolute_coding_enabled_flag[ j ][ i ] = 1 | |
|       if( vps_map_absolute_coding_enabled_flag[ j ][ i ] == 0 ) { | |
|         vps_map_predictor_index_diff[ j ][ i ] | ue(v) |
|       } | |
|     } | |
|     vps_auxiliary_video_present_flag[ j ] | u(1) |
|     vps_occupancy_video_present_flag[ j ] | u(1) |
|     vps_geometry_video_present_flag[ j ] | u(1) |
|     vps_attribute_video_present_flag[ j ] | u(1) |
|     if( vps_occupancy_video_present_flag[ j ] ) | |
|       occupancy_information( j ) | |
|     if( vps_geometry_video_present_flag[ j ] ) | |
|       geometry_information( j ) | |
|     if(vps_attribute_video_present_flag[ j ] )   404C | |
|       attribute_information( j )   402C | |
|   } | |
|   vps_pack_video_enabled_flag | u(1) |
|   if( vps_pack_video_enabled_flag ) | |
|     pack_information( ) | |
|   vps_extension_present_flag | u(1) |
|   if( vps_extension_present_flag ) {   406C | |
|     vps_vpcc_extension_flag | u(1) |
|     vps_miv_extension_flag | u(1) |
|     vps_extension_6bits | u(6) |

FIG. 4D

| Syntax element | MIV Main profile | MIV Extended profile |
|---|---|---|
| vuh_unit_type | 0 (V3C_VPS), 1 (V3C_AD), 3 (V3C_GVD), 4 (V3C_AVD) | 0 (V3C_VPS), 1 (V3C_AD), 2 (V3C_OVD), 3 (V3C_GVD), 4 (V3C_AVD), 5 (V3C_PVD) |
| asps_raw_patch_enabled_flag | 0 | 0 |
| vps_miv_extension_flag | 1 | 1 |
| ptl_profile_toolset_idc | 64 | 65 |
| ptl_profile_reconstruction_idc | 64 | 64 |
| gi_geometry_MSB_align_flag | 0 | 0 |
| ai_attribute_MSB_align_flag | 0 | 0 |
| asps_long_term_ref_atlas_frames_flag | 0 | 0 |
| asps_pixel_deinterleaving_enabled_flag | 0 | 0 |
| asps_patch_precedence_order_flag | 0 | 0 |
| afps_lod_mode_enabled_flag | 0 | 0 |
| afps_raw_3d_pos_bit_count_explicit_mode_flag | 0 | 0 |
| afti_single_tile_in_atlas_frame_flag | 1 | 1 |
| ath_type | I_TILE | I_TILE |
| atdu_patch_mode | I_INTRA | I_INTRA |
| asps_eom_patch_enabled_flag | 0 | 0 |
| vps_map_count_minus1 | 0 | 0 |
| asps_point_local_reconstruction_enabled_flag | 0 | 0 |
| ai_attribute_dimension_minus1 | 2 | 2 |
| ai_attribute_dimension_partitions_minus1 | 0 | 0 |
| vme_embedded_occupancy_flag | 1 | 0, 1 |
| vps_occupancy_video_present_flag[ j ] | 0 | 0, 1 |
| vps_packing_enabled_flag | 0 | 0, 1 |

| packing_information( ) { | Descriptor |
|---|---|
| pi_num_packs | u(5) |
| for( k= 0; k < pi_num_packs; k++ ) { | |
|     pi_pack_codec_id[ k ] | u(8) |
|     pi_pack_nominal_2d_bitdepth_minus1[ k ] | u(5) |
|     pi_pack_width[ k ] | u(16) |
|     pi_pack_height k ] | u(16) |
|     pi_num_rect[ k ] | u(8) |
| for( i = 0; i < pi_num_rect[ k ]; i++ ) { | |
|     pi_rect_pos_x[ k ][ i ] | u(v) |
|     pi_rect_pos_y[ k ][ i ] | u(v) |
|     pi_rect_width[ k ][ i ] | u(v) |
|     pi_rect_height[ k ][ i ] | u(v) |
|     pi_rect_orientation[ k ][ i ] | u(3) |
|     pi_rect_atlas_id[ k ][ i ] | u(v) |
|     pi_rect_type_id[ k ][ i ] | u(4) |
|     pi_rect_map_index[ k ][ i ] | u(4) |
|     pi_rect_auxiliary_video_flag[ k ][ i ] | u(1) |
|     if ( pi_rect_type_id[ k ][ i ] = = AVD) { | |
|         pi_rect_attr_index[ k ][ i ] | u(5) |
|         if | |
| (ai_attribute_dimension_partitions_minus1[ pi_rect_atlas_id[ k ][ i ] ][ pi_rect_attr_index[ k][ i ] ] > 0) | |
|         pi_rect_attr_partition_index[ k ][ i ] | u(5) |
| } | |
| } | |
| } | |
| } | |
| } | |

FIG. 5

| pack_independent_regions( ) { | Descript or |
|---|---|
|    pir_num_pack | u(5) |
|    for( k= 0; k < pir_num_pack; k++ ) { | |
|       pir_description_type_idc [ k ] | u(2) |
|       pir_num_rect[ k ] | u(8) |
|       for( i = 0; i < pir_num_rect[ atlasIdx][ k ]; i++ ) { | |
|         if( pir_description_type_idc[ k ] = = 0 ) { | |
|           pir_top_left_tile_idx[ k ][ i ] | ue(v) |
|           pir_bottom_right_tile_idx[ k ][ i ] | ue(v) |
|         } | |
|         else if( pir_description_type_idc = = 1 ) { | |
|           pir_subpic_id[ k ][ i ] | ue(v) |
|       } | |
|    } | |

FIG. 6

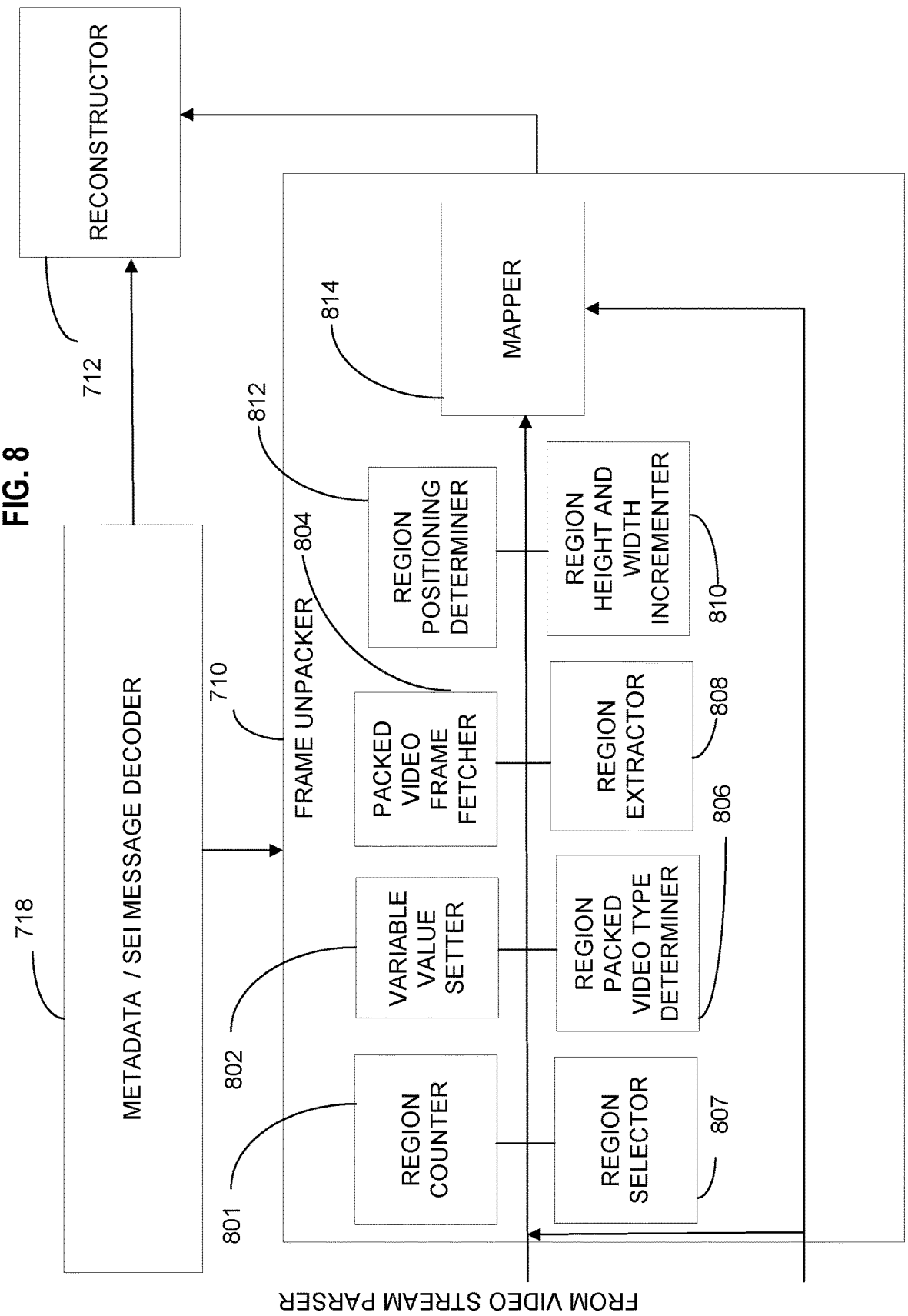

```
for (i = 0; i < pi_num_rect[ i ]; i++) {
   atlasIdx = pi_rect_atlas_id[ k ][ i ]
   mapIdx = pi_rect_map_index[ k ][ i ]
     for (y = 0; y < pi_rect_height[ k ][ i ] ; y++) {
       for (x = 0; x < pi_rect_width[ k ][ i ] ; x++) {
          sample = decPackFrame [ frameIdx ][ compIdx ]
           [pi_rect_pos_y[ k ][ i ] + y ][ pi_rect_pos_x[ k ][ i ] + x ]
       if (pi_rect_type_id[ k ][ i ] == V3C_OVD)
            decOccFrame[atlasIdx][mapIdx][frameIdx][compIdx][y] ][ x ] = sample
       else if (pi_rect_type_id[ k ][ i ] == V3C_GVD)
            decGeoFrame[atlasIdx][mapIdx][frameIdx][compIdx][y][x] = sample
       else if (pi_rect_type_id[ k ][ i ] == V3C_AVD) {
             attrIdx = pi_rect_attribute_index[ k ][ i ]
            decAttrFrame[atlasIdx][attrIdx][mapIdx][partIdx][frameIdx][compIdx][y]
                      [ x ] = sample
       }
      }
     }
    }
  }
```

FIG. 9

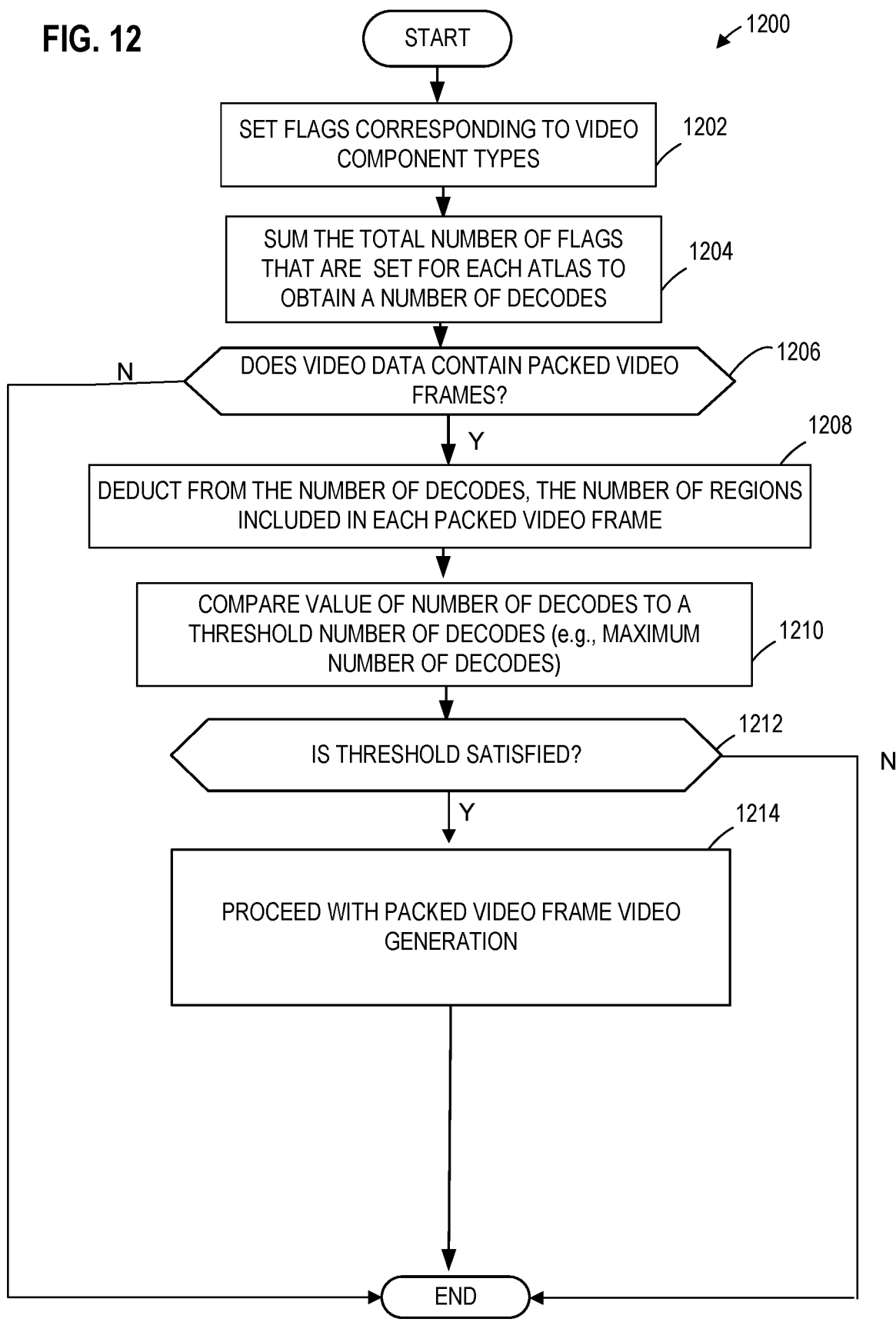

```
NumDecodes = 0
for(j = 0; j <= vps_atlas_count_minus1 ; j++ ) {
   NumDecodes += vps_auxiliary_video_present_flag[ j ]
   NumDecodes += vps_occupancy_video_present_flag[ j ]
   NumDecodes += vps_geometry_video_present_flag[ j ]
   NumDecodes +=  vps_attribute_video_present_flag[ j ] * (vps_map_count_minus1[j]+1)
   NumDecodes+=(vps_attribute_video_present_flag[j]?ai_attribute_count[j]:0)*vps_map_count_minus1[ j ]+1
                     )

if (vps_pack_video_enabled_flag)
  for(k=0;k< pi_num_packs; k++) {
      NumDecodes -= (pi_num_rect_minus1[ k ] )

NumDecodes shall be less than or equal to MaxDecodes
```

FIG. 13

METHOD, APPARATUS, AND ARTICLES OF MANUFACTURE TO GENERATE PACKED VIDEO FRAMES FOR A VOLUMETRIC VIDEO BITSTREAM AND AN IMMERSIVE VIDEO BITSTREAM

RELATED APPLICATION

This patent arises from the national stage of International Patent Application No. PCT/US2020/067066, which is titled "METHODS, APPARATUS, AND ARTICLES OF MANUFACTURE TO GENERATE PACKED VIDEO FRAMES FOR A VOLUMETRIC VIDEO BITSTREAM AND AN IMMERSIVE VIDEO BITSTREAM," which was filed on Dec. 26, 2020, which claims the benefit of U.S. Provisional Application No. 63/040,369, which is titled "METHODS, APPARATUS, AND ARTICLES OF MANUFACTURE TO GENERATE PACKED VIDEO FRAMES FOR A VOLUMETRIC VIDEO BITSTREAM AND AN IMMERSIVE VIDEO BITSTREAM," and which was filed on Jun. 17, 2020. International Patent Application No. PCT/US2020/067066 and U.S. Provisional Patent Application No. 63/040,369 are hereby incorporated by reference in their respective entireties. Priority to International Patent Application No. PCT/US2020/067066 and U.S. Provisional Patent Application Ser. No. 63/040,369 is hereby claimed

FIELD OF THE DISCLOSURE

This disclosure relates generally to immersive video, and, more particularly, to methods and apparatus to generate data packs for an immersive video bitstream.

BACKGROUND

Volumetric video is captured using a number of video processing tools and cameras and the result is formatted in three degrees of freedom. As such, the user is provided with a sensation and perspective of being immersed in another time/place via the virtual environment portrayed by the volumetric video. Additionally, the user can move around within the virtual environment further lending to the sensation that the user has been transported to another space or time. As such, commercial applications that use volumetric video including virtual/augmented/mixed reality applications, are rapidly improving and the popularity and promise of volumetric video technology is causing an explosion of interest in this field.

BRIEF DESCRIPTION OF THE DRAWINGS

FIG. 4A is a table representing an example modification to V3C unit header types to include a unit header type representing packed video data.

FIG. 4B is pseudo code that identifies V3C unit information to be obtained and/or generated when a V3C unit header indicates a V3C unit contains packed video data.

FIG. 4C is pseudocode identifying a manner in which a V3C parameter set can be modified to identify when a V3C unit includes pack video and corresponding pack information.

FIG. 4D is a table representing the definition of V3C profiles that indicate allowable values of syntax elements for an MIV Main Profile and for an MIV Extended Profile.

FIG. 5 is pseudocode to implement the pack information generator of the frame packer of FIG. 2 and FIG. 3.

FIG. 6 is pseudocode to implement the example pack information generator of the example frame packer of FIG. 2 and FIG. 3.

FIG. 8 is a block diagram of a portion of the decoder of FIG. 7 including the example frame unpacker of FIG. 7, according to an example embodiment of the invention.

FIG. 9 is pseudocode that can be used to implement at least a portion of the example frame unpacker of FIG. 6 and FIG. 7.

FIG. 12 is a flowchart illustrating an example program to implement the number of decoders verifier of the encoder of FIGS. 2 and 3 3.

FIG. 13 is pseudocode that can be used to implement the example decoder verifier of FIG. 8.

Figure 1A:
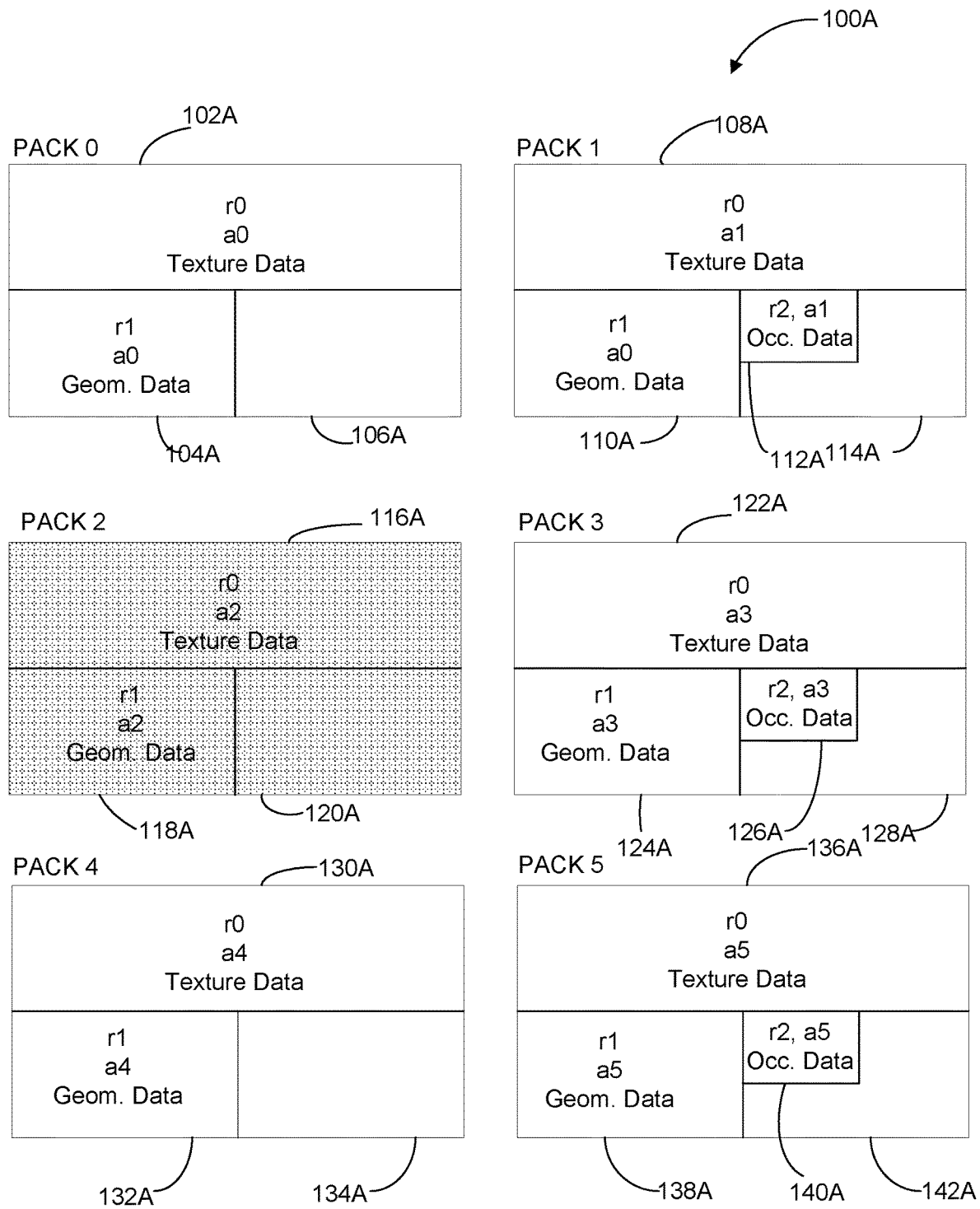
FIG. 1A is an illustration of an example first pack configuration in which atlas information can be packed in accordance with the invention.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Visual volumetric video refers to a collection of visual volumetric video coded (V3C) frames. The V3C frames are encoded by converting three dimensional information of the V3C frames into a collection of two dimensional images. The two dimensional images can then be encoded using any video and image coding specifications (e.g., such as ISO/IEC 14492-10, ISO/IEC 23008-2, etc.). V3C data associated with the two dimensional encoded images can be used to reconstruct the V3C to recreate a three dimensional video.

A view, captured by a camera, can be represented as a basic view or can be represented as an additional view. A basic view includes all of the video data corresponding to a view being captured by cameras. In contrast, an additional view contains video data corresponding to one or more patches (portions) of the captured view that differ relative to a reprojection of another view to the position of the basic view. Thus, instead of retransmitting, in its entirety, all of the information needed to reconstruct each view, after one or more basic views is obtained, only information pertaining to the portions (patches) of the basic view that have changed between time instances are transmitted.

The portions of the views that are transmitted are referred to as patches and are contained/represented in an atlas. In an atlas or atlas tile, the patches represent components at a particular position in the view. An atlas may contain one or more atlas tiles. The components are various types of video data and can include data related to geometry, color, reflectance, surface information, texture, occupancy, materials, objects, etc. An access unit includes one or more atlases, corresponding to multiple views captured on multiple cameras at a same time instance, and, as a result, an access unit includes a collection of atlases that all correspond to a same time instance.

Often, to achieve a high quality immersive experience for the user, V3C video is captured using many cameras and results in a large quantity of video data. Further, in some instances, attributes (and other types of information) associated with the V3C video and/or MPEG immersive video data are to be signaled explicitly in separate video sub-bitstreams. For example, an MPEG immersive (MIV) video access unit refers to all sub-bitstream composition units that share a same decoding order count. The sub-bitstream composition units can include a sub-bitstream composition unit containing occupancy information, a sub-bitstream composition unit containing an attribute, a sub-bitstream composition unit containing geometry information, etc. Thus, a large number of sub-bitstreams, each requiring a separate decoder, may be included in an encoded visual volumetric video transmission.

Due to the number of bitstreams and the large amount of video data, multiple decoder instantiations are typically required to reconstruct the video and synchronize the operation of the decoder instantiations. Although, high end devices such as personal computers generally have enough decoder instantiations to synchronously handle the various bitstreams of the visual volumetric video data, mobile electronic devices are typically not equipped to synchronize multiple video decoder instantiations. As a result, mobile electronic devices are often unable to provide a quality immersive video experience to the user.

The systems, methods, apparatus, and articles of manufacture disclosed herein use a frame packing technique prior to encoding V3C video data. Using the frame packing technique disclosed herein results in fewer bitstreams and, thus, the need for fewer decoder instantiations. The frame packing technique results in one or more packed video frames containing the information that will be used at a decoder to reconstruct a three dimensional image from the raw video data. As used herein, a "packed video frame" refers to a frame-packed video layout that includes multiple regions, the individual regions. Each region contains a type of video component data (also referred to herein as a "video data type" or "type of video data") associated with an atlas or an atlas tile (e.g., geometry, occupancy, attribute, etc.). Each region can represent a geometry, occupancy, or attribute video sub-bitstream of an atlas or an atlas tile. Each region represents data that would otherwise be carried by a video sub-bitstream containing only one type of component data (e.g., geometry, occupancy, attribute, etc.). Further, in some examples, a packed video frame does not need to be fully occupied by regions such that padding of unoccupied spaces is permitted (if needed, for example, to make the encoded output data more video codec friendly). As used herein, the terms rect, rectangle, reg and region are used interchangeably. As described herein, although a region can take a geometrical shape of a rectangle, a region can instead take any shape and is in no way limited to a rectangular shape. As used herein, some of the variables include "rect," in such examples, the "rect" is used to refer to a region (also abbreviated as "reg").

The frame packing techniques disclosed herein use packed frame video information that is supplied with the encoded video sub-bitstream of volumetric video data. The packed frame video information is used at the decoder to identify regions included in the packed frame, information about the locations and dimensions of the regions, information about the type of video component included in the region, mapping information by which the region can be mapped to a sequence of video frames to be rendered, etc. The generating and supplying of this information with the encoded volumetric video data allows the packed frames to be generated at an encoder and then unpacked at a decoder. Further, in some examples, independently decodable regions can be identified and a supplemental enhancement information (SEI) message can be generated to signal the presence of such regions and provide information about where to locate the regions. In such examples, multiple independently decodable regions can be decoded by multiple decoders in parallel.

The frame packing technique disclosed herein reduces the number of decoder instantiations needed to decode the encoded video because the number of bitstreams needed to carry the encoded video signal is lower as the information included in an atlas (that would normally be carried in multiple sub-bitstreams, each representing a component type) can be put into a single packed video frame that can be decoded with a single decoder. Even when the frame packing technique results in the creation of more than one packed video frame, the number of packed video frames created and the corresponding number of decoders needed to decode the packed video frames are fewer than the number of decoders that would be needed if the encoded video were not packed video frames as described further below.

FIG. 1A is an illustration of an example first packed video frame configuration 100A in which atlas information can be packed in accordance with the invention. In the example of FIG. 1A, metadata concerning texture data, geometry data and occupancy data of different atlases are included in regions that are inserted into a set of packed video frames (e.g. a Pack 0A, a Pack 1A, a Pack 2A, a Pack 3A, a Pack 4A, and a Pack 5A). In the example of FIG. 1A, an initial region "r0" 102A of Pack 1A is populated with texture data of a first atlas "a0," a second region "r1" 104A of the Pack 0A is populated with geometry data of the atlas a0, and a portion 106A of the Pack 0 is unpopulated. As a basic view does not include occupancy data, the atlas a0 is assumed to represent a basic view.

In the example of FIG. 1A, the packed video frame ("Pack 1A") includes data from the atlas a0, and the atlas a1, contained in three regions (e.g., region r0 108A, region r1 110A, and region r2 112A. The region r0 of Pack 1A contains texture data from an atlas "a1." The region r1 110A of Pack 0A contains geometry data from the atlas a0. In some examples, the region r2 112 of Pack 1A contains occupancy data from the atlas a1. Further, the region r2 occupies a portion 114A of an otherwise empty region.

In the example of FIG. 1A, a region "r0" 116A of Pack 2A is populated with texture data of the atlas a2, a region "r1" 118A is populated with geometry data of the atlas a2, and a portion 120A of Pack 2A is unpopulated.

In the example of FIG. 1A, a region r0 122A of Pack 3A is populated with texture data of an atlas "a3," and a region r1 124A is populated with geometry data of the atlas a3. Additionally, a region r2 126A is populated with occupancy data of the atlas a3, and a portion 128A (in which region r2 is disposed) is otherwise unpopulated.

In the example of FIG. 1A, a region r0 130A of Pack 4 is populated with texture data of an atlas "a4", a region r1 132A is populated with geometry data of the atlas a4, and a portion 134 of Pack 4 is unpopulated.

Further, in the example of FIG. 1A, a region r1 136A of Pack 5A is populated with texture data of an atlas "a5," and a region r1 138A is populated with geometry data from of the atlas a5. Additionally, a region r2 140A is populated with occupancy data of the atlas a5, and a portion 142 containing the region r2 140A is otherwise unpopulated.

Thus, the frame pack configuration 100A of FIG. 1A illustrates a sequence of six packed video frames (Pack 0A, Pack 1A, Pack 2A, Pack 3A, Pack 4A and Pack 5A) of data from six different atlases. As illustrated, data associated with six atlases is packed and three of the atlases are associated with two types of data (texture and geometry) and three of the atlases are associated with three types of data (texture, geometry and occupancy). Were the data represented in the six packed video frames of FIG. 1A transmitted using conventional techniques fifteen (e.g., (3*2)+(3*3)=15) sub-bitstreams would be required to carry the data and 15 different decoders would be required to decode the data. By using the configuration 100A of FIG. 1A, only six bitstreams are required to carry the data (one for each packed video frame) and, therefore, only six decoders are required to decode the six bitstreams. As described above, the first packed video frame configuration 100A shows a packing of different video components of a same atlas in a same packed video frame of a sequence of packed video frames including six packed video frames (Pack 0, Pack 1, Pack 2, Pack 3, Pack 4, Pack 5).

As illustrated in FIG. 1A, each of the packed video frames is formed of a set of Blocks having specific locations in the video pack as illustrated in Pack 2. In some examples, the information of each Block of each will eventually be mapped into a volumetric video sequence. Examples of such mapping is described below. The Blocks are associated with each region, though for clarity are only illustrated in Pack 2.

Figure 1B:
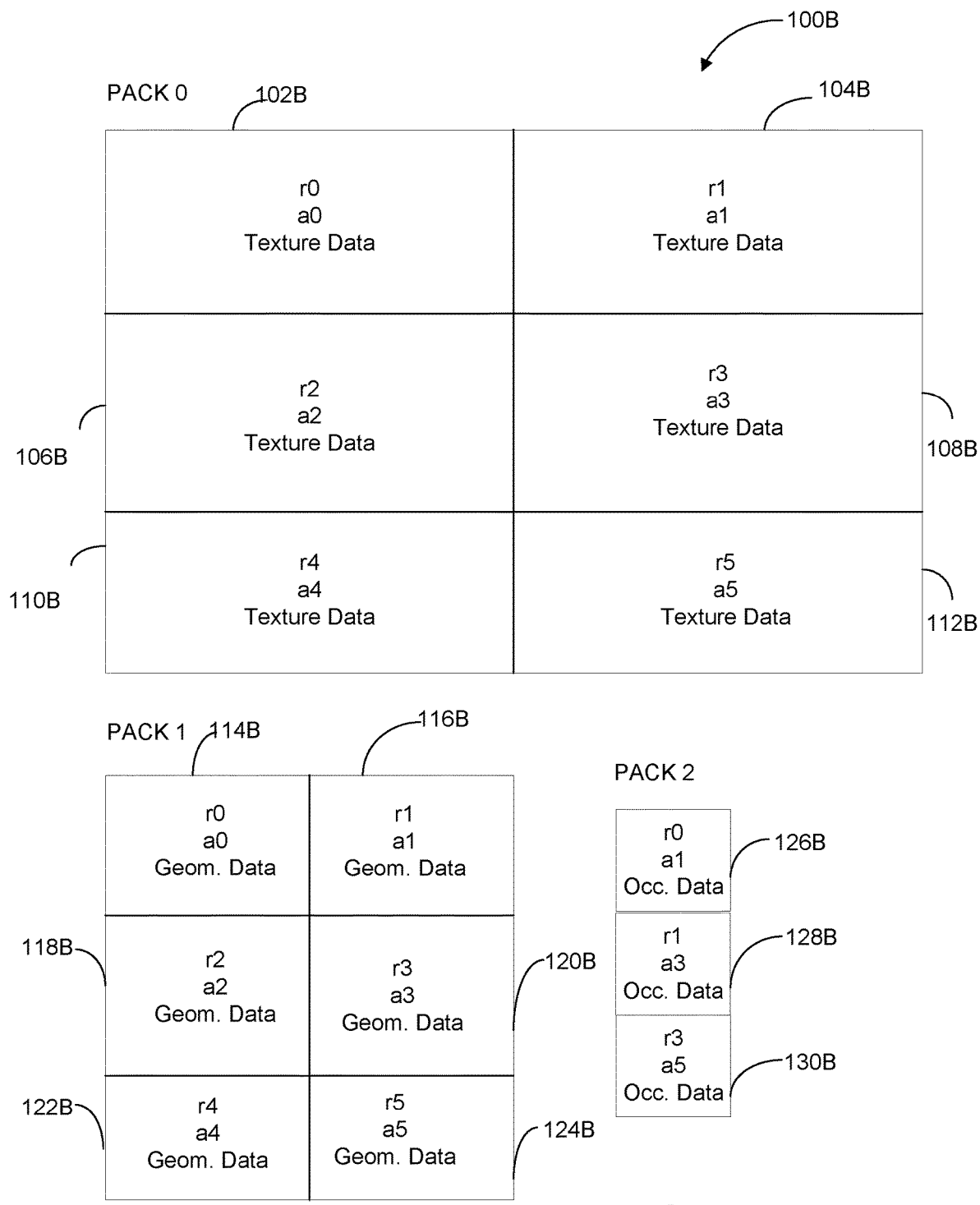
FIG. 1B is an illustration of an example second pack configuration in which atlas information can be packed.

FIG. 1B is an illustration of an example second packed video frame configuration 100B in which information/data from multiple atlas tiles can be packed. The second packed video frame configuration includes three packed video frames (e.g., a packed video frame Pack 0B, a packed video frame Pack 1B, and a packed video frame Pack 2B). In the second packed video frame configuration 100B, the first packed video frame Pack 0B contains six regions (a region r0 102B, a region r1 104B, a region r2 106B, a region r3 108B, a region r4 110B, and a region r5 112B). In the example second configuration of FIG. 1B all six of the regions of Pack 0B contain texture data, and the texture data contained in each region is associated with a different atlas tile (e.g., atlas tile a0, atlas tile a1, atlas tile a2, atlas tile a3, atlas tile a4, and atlas tile a5, respectively).

The second packed video frame 1B also contains six regions (the region r0 114B, the region r1 116B, the region r2 118B, the region r3 120B, the region r4 122B, and the region r5 124B). All of the six regions contain geometry data, and the geometry data contained in each region of the Pack 1B is associated with a different atlas tile (e.g., atlas tile a0, atlas tile a1, atlas tile a2, atlas tile a3, atlas tile a4, and atlas tile a5, respectively). The third packed video frame, Pack 2B contains three regions, region r0 126B, region r1 128B, and region r3 130B each of which includes occupancy data of a different atlas tile (atlas tile a0, atlas tile a3, and atlas tile a5, respectively). The second frame packed video frame configuration 100B thus includes atlas data of six atlas tiles in which geometry and texture data is included in three of the atlas tiles and geometry, texture and occupancy data is included in three of the atlas tiles.

Figure 1C:
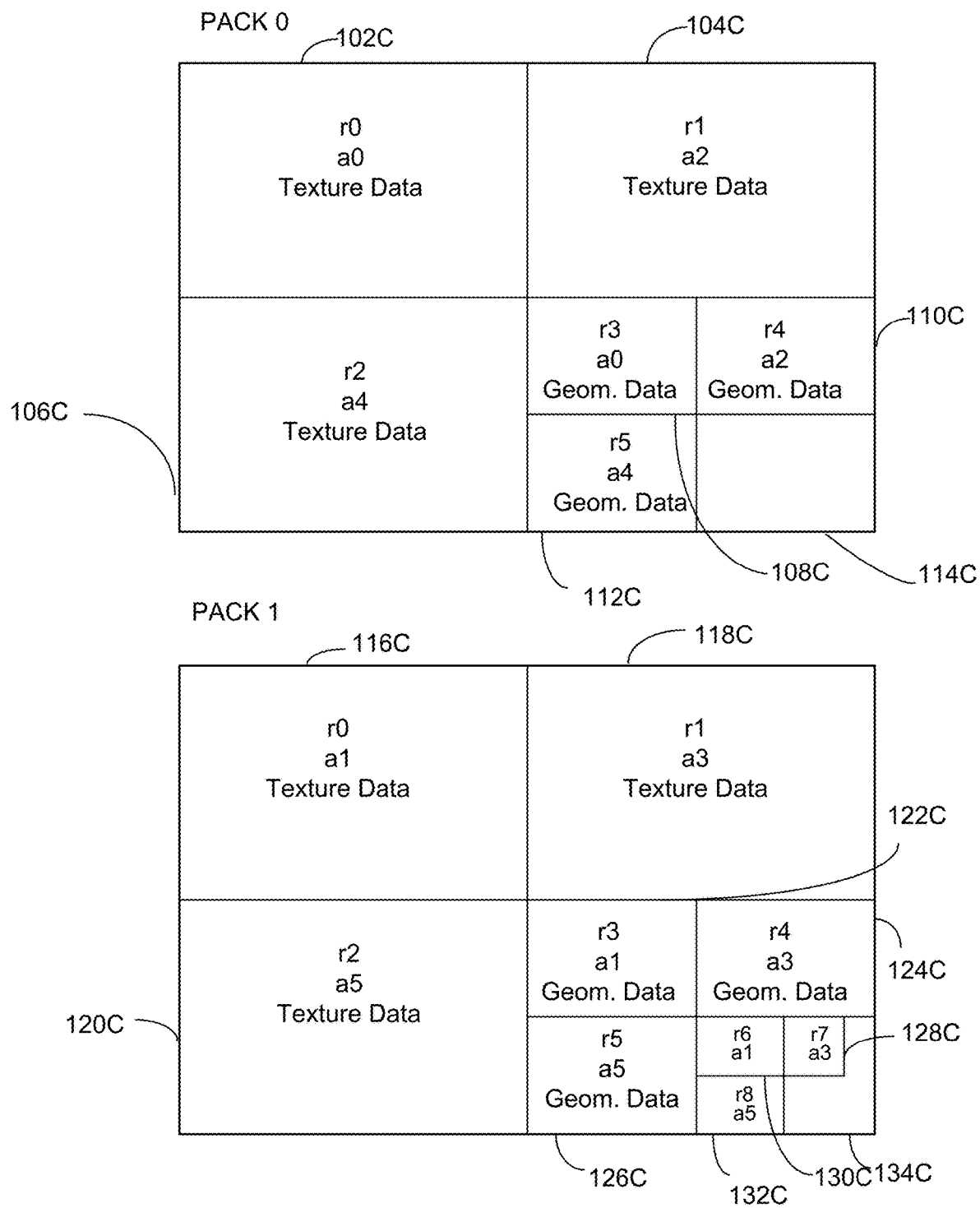
FIG. 1C is an illustration of an example third pack configuration in which atlas information can be packed.

FIG. 1C illustrates an example third packed video frame configuration 100C that includes a Pack 0C and a Pack 1C. In the third packed video frame configuration 100C, the Pack 0C includes six regions (reg r0 102C, reg r1 104C, reg r2 106C, reg r3 108C, reg r4 110C, reg r5 112C). Reg r0 102C, reg r1 104C, and reg r2 106C each occupy one quarter of the area of Pack 0C. Each of the reg r0 102C, reg r1 104C and reg r2 106C contains texture data corresponding to the atlas tile a0, the atlas tile a2 and the atlas tile a4, respectively. The Pack 0C also includes three regions (reg r3 108C, r4 110C, r5 114Ca) that each occupy one/sixteenth of the area of Pack 0C. Each of the three regions (reg r3 108C, r4 110C, r5 114Ca) contain geometry data from the atlas tile a0, the atlas tile a2 and the atlas tile a4, respectively. Thus Pack 0 includes texture and geometry data of atlas tiles a0, the atlas tile a2 and the atlas tile a4, each of which represent a basic view. One sixteenth of Pack 0C does not include any data.

Pack 1C of FIG. 1C includes three regions (reg r0 116C, reg r1 118C, and reg r2 120C), that each occupy one quarter of the area of Pack 1C. Each of the three regions (reg r0 116C, reg r1 118C, and reg r2 120C) contain texture data corresponding to the atlas tile a1, the atlas tile a3 and the atlas tile a5, respectively. The Pack 1C also includes three regions (reg r3 122C, reg r4 124C, and reg r5 126C) that each occupy one/sixteenth of the area of Pack 1C. Each of the three regions (reg r3 122C, reg r4 124C, and reg r5 126C) contain geometry data from the atlas tile a1, the atlas tile a3 and the atlas tile a5, respectively. Additionally, the Pack 1C includes three regions (reg r6 126C, reg 7 128C, and rec r8 130C). The reg r6 and the reg r8 each occupy one/32nd of the area of Pack 1C and the reg r7 occupies less than one/thirty-second of the area of Pack 1C. Each of the three regions (reg r6, reg 126C, reg r7 128C, and reg r8 130C) contain occupancy data from the atlas tile a1, the atlas tile a3 and the atlas tile a5, respectively. Thus, Pack 1C of FIG. 1C includes texture and geometry data of the atlases (the atlas tile a0, the atlas tile a2 and the atlas tile a4), and also includes occupancy data of the atlases (the atlas a1, the atlas a3, and the atlas a5). Pack 1C further includes a portion 134C that is void of data. Note that individual components packed together within the same packed video frame, may be coded at different frame rates (e.g. packed video frame of textures atlases can be sent @60 fps while packed video frame of geometry atlases may be sent at 30 fps to achieve further compression or support desired features depending on the applications). Although, in the example configurations of FIG. 1A, FIG. 1B, and FIG. 1C are assumed to be based on atlases or atlas tiles of a same size, the atlases or atlas tiles can instead be of different sizes.

An encoded video bitstream contains an encoded representation of video data. More specifically, the bitstream includes a series of Network Abstraction Layer (NAL) units. Each of the NAL units include a NAL unit header and a Raw Byte Sequence Payload (RBSP). Information also included in the bitstream can be used to identify the end of an RBSP. In some examples, a unit can include more than one packed video frame (e.g., a sequence of packed video frames).

For illustrative purposes only, the regions of FIGS. 1A, 1B and 1C are rectangular. In practice, the regions can take any shape provided that the regions do not overlap.

Figure 2:
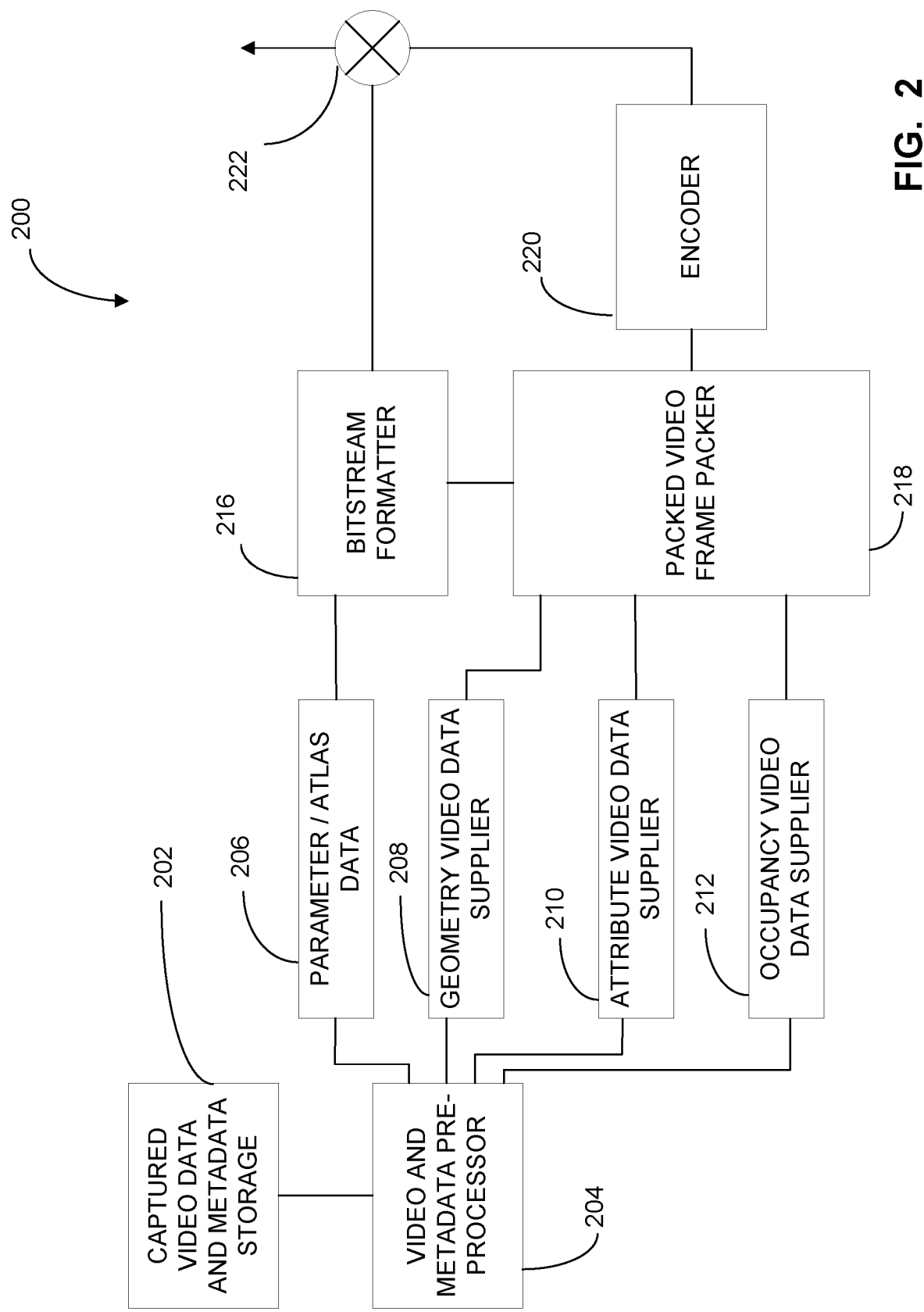
FIG. 2 is a block diagram of an example video encoder having an example frame packer in accordance with the invention.

Turning now to FIG. 2, FIG. 2 is a block diagram of a simplified encoding system 200 according to the teachings of this disclosure. The simplified encoding system 200 includes an example captured video data and metadata storage 202, an example video and metadata pre-processor 204, an example parameter/atlas data supplier 206, an example geometry video data supplier 208, an example attribute video data supplier 210, an example occupancy video data supplier 212, an example bitstream formatter 216, an example frame packer 218, an example encoder 220 and an example multiplexer 222.

In some examples, captured video data and metadata is stored in the example captured video data and metadata storage 202. The example video metadata pre-processor 204 examines the video data and metadata and separates the metadata (e.g., the parameter and atlas data) from the different types of video included in the video data (e.g., geometry, attribute, occupancy, etc.). Further, the video and metadata pre-processor 204 separates the different types of video data (geometry, attribute and occupancy data from each other) and supplies each to a geometry video supplier 208, an attribute video data supplier 210, and an occupancy video supplier 212, respectively. In some examples, the parameter and atlas data are supplied to the parameter and atlas data supplier 206. The geometry video data supplier 208, the attribute video data supplier 210 and the occupancy video supplier 212 supply the geometry video data, the attribute video data and the occupancy video data, respectively, to the example frame packer 218 and the parameter/atlas data supplier 206 supplies the parameter/atlas data to the example bitstream formatter 216. A video data type is also referred to herein as a video component type.

In some examples, the geometry video data, the attribute video data and the occupancy video data is supplied to the example packed video frame packer 218. In addition, the parameter/atlas data is supplied to the example bitstream formatter 216. In some examples, the bitstream formatter 216 and the packed video frame packer 218 share information needed to determine a packed video frame configuration (e.g., the packed video frame configuration of FIG. 1A, the packed video frame configuration of FIG. 1B, and/or the packed video frame configuration of FIG. 1C) that includes the geometry, attribute and occupancy data supplied to the packed video frame packer 218. In some examples, the packed video frame packer 218 supplies the packed video frames to the example encoder 220 for encoding using any suitable encoding method. The packed video frame packer 218, in addition to generating the packed video frames, also generates packed video frame information for use by a decoder in determining where regions of video included in the packed video frames are to be placed for purposes of generating a volumetric video sequence for rendering.

The example bitstream formatter 216 determines a bitstream format for the parameter/atlas data 206 that will correspond to the video data contained in the packed video frames generated by the frame packer 218. In some examples, the parameter/atlas data 206 further includes SEI messages. In some examples SEI message information is supplied to the bitstream formatter 216 by the packed video frame packer 218. In some examples, the bitstream formatter 216 supplies bitstream format information and the encoder 220 supplies the encoded packed video frames the packed video frame information to the example multiplexer 222 which operates to multiplex the bitstream format information with the encoded packed video frames. In some examples, the SEI message identifies one or more regions of one or more packed video frames that can decoded independently of other regions. In some examples, such regions can be decoded by respective decoders in parallel.

Figure 3:
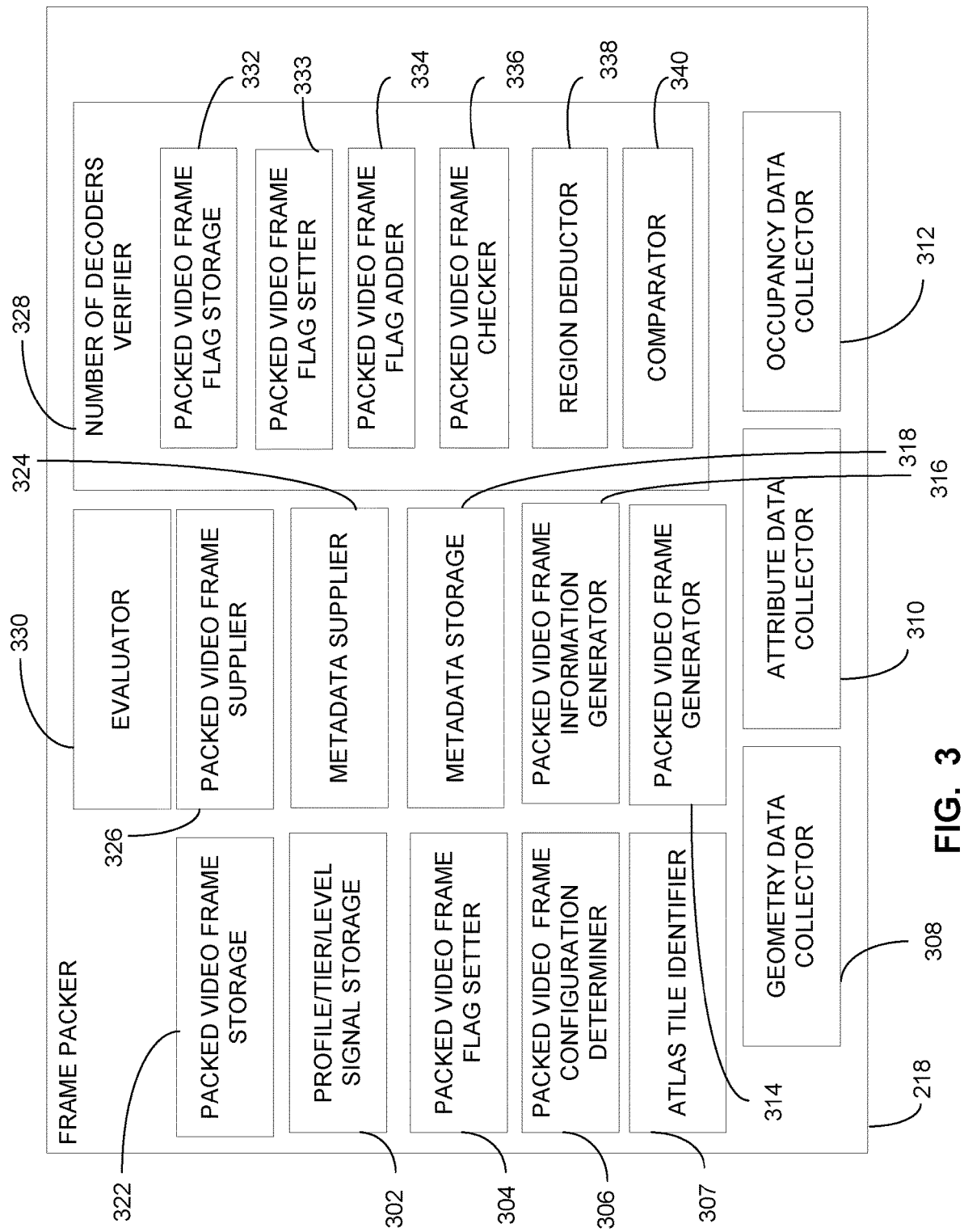
FIG. 3 is a block diagram of the example frame packer of FIG. 2, according to an example embodiment of the invention.

FIG. 3 is a block diagram of the example frame packer 218 of FIG. 2. In some examples, the frame packer 218 of FIG. 3 includes an example profile/tier/level storage 302, an example packed video frame flag setter 304, an example packed video frame pack configuration determiner 306, an example atlas/atlas tile identifier 307, an example geometry video collector 308, an example attribute video reg collector generator 310, an example occupancy video collector generator 312, an example packed video frame generator 314, an example packed video frame information generator 316, an example metadata storage 318, an example packed video frame storage 322, an example metadata supplier 324, an example packed video frame supplier 326, an example number of decoders verifier 328, an example evaluator 330, an example packed video frame flag storage 332, an example packed video frame flag setter 333, an example packed video frame flag adder 334, an example packed video frame checker 336, an example reg deductor 338, and an example comparator 340.

In some examples, the encoder 220 operates in accordance with a video encoding standard having a syntax that defines a profile field, a tier field and a level field. In some examples, a "profile" of a video coding standard defines what coding tools may be used. For example, for an encoding system 200, a profile can specify a set of coding tools that the encoding system 200 can use to generate coded bitstreams. Likewise, an encoder profile can specify a type of video decoder that can decode video data generated by the video encoder, including a set of coding tools that a video decoder must have in order to be able to decode bitstreams associated with the profile. In some examples, a level is a defined set of constraints on the values that may be taken by the syntax elements and variables of a video coding standard. A tier is a specified category of level constraints imposed on values of the syntax elements in the bitstream or values of variables. The level constraints are nested within a tier and a decoder conforming to a certain tier and level would be capable of decoding all bitstreams that conform to the same tier or the lower tier of that level or any level below that level. Thus, a level of a tier is a specified set of constraints imposed on values of the syntax elements in the bitstream or variables used in decoding the bitstream. In some examples, the information of the profile/tier/level specifies a constraint on a number of decoders that are needed to decode a bitstream at a decoder. In some examples, the constraint identifies a maximum amount of encoders that can used to decode the bitstream because a decoder having fewer decoders will be unable to decode the bitstream. In some examples, an encoding system can use the profile/tier/level information to identify a number of decoders needed and ensure the encoding to occur at the encoding system will not violate the constraint on the number of decoders. In some examples, the encoding system can determine a number of decoders that will be needed to decode the bitstream based on characteristics of the information that is needed to be encoded to form a properly formatted bitstream with the corresponding video components.

In some examples, as described further below, to limit the number of decoder instantiations needed to decode an encoded bitstream the profile/tier/level syntax structure is modified to include a set of bits defined to indicate a maximum number of such decoder instantiations. In some examples, the profile/tier/level syntax can include, for example, a set of bits (e.g., 4) represented by the variable "ptl_max_decodes_idc" and is used to indicate a constraint on the number of sub-bitstreams requiring a video decoder instantiation to which coded video sequence conforms. Bitstreams contain values of "ptl_max_decodes_idc" as specified below. For example, the 4 bits of a variable "ptl_profile_codec_group_idc" can indicate one of the values 0, 1, 2, 3, 4, 5, 6, 7, 8, 9, and each one of such values can correspond to a different maximum number of decoder instantiations (e.g., 1, 2, 3, 4, 6, 8, 12, 16, 24, 32, respectively). The values 10-14 can be reserved for future use and the value 15 can be unconstrained. As some devices (decoders) can support a large number of simultaneous decodes, others may not have such capacity. As a result, the same content can be encoded according to multiple profiles so that the output bitstreams can be decoded by decoding devices having different decoding capacities. Thus, the addition of the profile/tier/level corresponding to the maximum number of decodes enables the use of multiple profiles to support the multiple encoding of a same bitstream so that the bitstream can be decoded by decoding devices having different decoding capacities. In some examples, the example profile/tier/levels supported by an encoding system 200 are stored in the example profile/tier/level storage 302. As described above, in some examples, the encoding system 200 may be able to encode multiple video bitstreams each corresponding to a different one of the multiple profiles and the multiple profiles each having a different maximum number of decoders (represented by the variable "max_decode_idc") to support decoding devices having varying levels of decode capacity.

In some examples, the information stored in the profile/tier/level signal storage is set by a manufacturer of the encoding system 200. In some examples, the information stored in the profile/tier/level signal storage can be populated by an operator of the encoding system 200 and/or can be re-set/revised by such operator. In some examples, the information stored in the profile/tier/level signal storage can be received from another of the encoder blocks included in FIG. 2. In some examples, a packed frame configuration used by the frame packer 218 to form the packed video frames of regions is governed at least in part by the information stored in the profile/tier/level signal storage as each packed video frame included in a configuration of packed video frames requires a decoder instantiation on the decoding side. Thus, the profile/tier/level information, by specifying a maximum number of decoder instantiations, can be consideration to be used when generating a packed video frame.

In some examples, when a natural abstraction layer unit (e.g., an NAL unit) of video is to be packed, the packed video frame flag setter 304 causes a packed frame video flag to be set. In some examples, setting the packed frame video flag includes setting one or more bits in the metadata storage 318. In some examples, based on the information in the profile/tier/level storage 302 or based on information supplied by any of the other blocks of FIG. 2, the packed video frame configuration determiner 306 determines a packed video frame configuration that identifies regions of the packed video frames, the dimensions of the regions, the locations of the regions, the types of data to be included in each of the regions, etc. Example packed video frame configurations are illustrated in FIG. 1A, FIG. 1B, and/or FIG. 1C. In some examples, any of a variety of packed frame video configurations can be determined based on aspects/characteristic of the video stream to be packed into packed video frames. For example, the determined packed video frame configuration can depend upon the number of views available, and the typical number of decoder instantiations of products for the use case.

As described above, in some examples, the packed video frame configuration includes information identifying a number of regions to be included in a packed video frame, dimensions (e.g., width, height) of each of the regions, types of data to be included in the regions, etc. In some examples, the packed video frame configuration uses the atlas tile identifier 307 to determine a number of atlases or atlas tiles associated with incoming geometry, attribute and occupancy video data to be processed. In some examples, the incoming geometry data, attribute data and occupancy data each includes information identifying an atlas or atlas tile to which the information corresponds. In some examples, the atlas tile identifier 307 examines the incoming geometry, attribute and occupancy data to determine the atlas or atlases or atlas tiles to which each of the types of data corresponds. In some examples, all geometry, attribute and occupancy data associated with a first atlas tile is received at a same time (or within a same period of time) at the packed video frame packer 218. In some such examples, the atlas identifier 307 can tag or otherwise associate the incoming geometry attribute and occupancy data with an atlas tile number/type (e.g., an atlas tile identifier 307, information identifying the atlas tile as being associated with a base view or an additional view, etc.).

In some examples, the example packed video frame generator 314 uses packed video frame information from the packed video frame information generator 316 to generate a packed video frame having separate regions that include the geometry data provided by the example geometry data collector 308, the attribute data provided by the example attribute data collector 310, and the occupancy data (if any) provided by the example occupancy data collector 312. In some examples, each region has dimensions (determined by the packed video frame configuration determiner 306) and/or the amount of collected geometry data, the amount of attribute data, the amount of occupancy data. It is noted that some atlases might not have occupancy data such that an occupancy region will not always exist for every geometry region and attribute region that exists.

In some examples, the packed video frame generator 314 uses the determined packed video frame configuration and/or the packed video frame information generator 316 to ensure that there is sufficient packed video frame information for a decoder to retrieve the regions of a corresponding packed video frame. In some examples, the packed video frame generator 314 stores the packed video frames in the example packed video frame storage 322. In addition, the packed video frame generator 314 includes the packed video frame information as metadata to be carried with the corresponding packed video frames or to be carried in metadata associated with the corresponding packed video frames. In some examples, the packed video frame information metadata can include dimensional information regarding the size of the regions, the placement of the regions within a sequence of volumetric video frames, atlas information identifying the atlas or atlas tile to which each of the regions corresponds, and any other information needed by a decoder to unpack the packed video frames of video data so that the unpacked data can be used to reconstruct a three dimensional image/view. In some examples, the example packed video frame information generator 316 stores the packed video frame information in the metadata storage 318 and the metadata supplier 324 supplies the packed video frame information to the packed video frame storage for inclusion with the corresponding packed video frames. In some examples, the metadata information and the corresponding video is not stored in the packed video frame storage but is supplied direct to the example encoder 220 for encoding. In some examples, the packed video frame(s) and corresponding packed video frame(s) are supplied to the example packed video frame supplier which supplies the same to the example encoder 220. In some examples, the metadata supplier 324 can supply information corresponding to an atlas or atlas tile of a packed video frame (or multiple packed video frames) to the example bitstream formatter of FIG. 2A. In some examples, the bitstream formatter of FIG. 2A formats parameter data and/or an SEI message associated with the corresponding packed video frame. In some examples, the example packed video frame supplier 326 supplies the packed video frames (obtained from the packed video frame storage 322) to the example encoder 220 of the example encoding system 200 of FIG. 2 at which the packed video frames are encoded.

In addition, the example multiplexer 222 causes the bitstream of metadata/parameter/SEI message data to be multiplexed with the corresponding encoded data for transportation to a decoder for decoding and rendering. It is noted that in some examples, the packed video frame generator 314 does not generate a packed video frame per se but correlates the packed video information 314 with the incoming, collected video data so that the video data can be decoded with the use of the packed video information. In some examples multiple packed video frames are simultaneously generated (e.g., correlated to corresponding packed video frame information) such that multiple packed video frames are generated at a same time (or within a same time period of each other). Thus, the packed video frames include packed video frame information that signals (to a receiving decoder) the presence of packed video frames and further signals the manner in which the volumetric video data contained in the packed video frames is to be placed for inclusion in a reconstructed volumetric video view.

As described briefly above, in some examples, the encoding system 200 includes features for specifying regions of the packed video frame(s) that can be decoded independently. In some examples, the encoding system aligns these regions with video codec independently coded regions, such as tiles or sub-pictures. In some such examples, the bitstream formatter creates an SEI message to signals the correspondence of packed video frames with independently decodable regions. In some such examples, the SEI message signals tile indices for the top left and bottom right tiles in a rectangular region of tile rows and columns, such as used in HEVC encoding standard temporal motion constrained tile sets. In some examples, the SEI message signals a sub-picture ID, such as used in the V3C encoding standard.

The foregoing enables use cases in which a Media Aware Network Element (MANE) or MIV decoder can discard some of the video bitstream, while enabling decoding of the remaining bitstream. An encoder may choose to select different Quantization Parameter (QP) values for different regions within the same packed video frame.

FIG. 4A, illustrates a set of V3C unit header types and FIG. 4B illustrates example information associated with a packed video frame unit of data. In some examples, video encoding standards include information to identify a type of data included in a packed video frame unit. For example, the V3C standard includes the following unit types, V3C parameter set data, atlas data, occupancy video data, attribute video data, and pack video frame data. In some examples, the units of data that are associated with or included in pack video frame data, are identified using the header "V3C_PVD," illustrated in FIG. 4A. In some examples, when encoded data is identified using a V3C_PVD unit header, metadata associated with the pack video frame data unit header includes a set of bits (e.g., 4 bits), represented by the variable "vuh_v3c_parameter_set_id," that identify the location of a parameter set associated with the pack video frame data unit. (See FIG. 4B). In addition, encoded data identified with a V3C_PVD unit header, is associated with metadata that includes a set of bits (e.g., 4 bits) represented by the variable "vuh_pack_index." The "vuh_pack_index" identifies a number assigned to the packed video frame associated with the pack video frame data unit). Thus, in some examples, the bitstream formatter of FIG. 2 is configured to include the bits of the "vuh_v3c_parameter_set_id" and the bits of the "vuh_pack_index" in the metadata associated with the packed video frame data unit. In some examples, each packed video frame sub-bitstream is associated with a separate value of "vuh_pack_index" and is associated with a codec specified by the variable "pi_pack_codec_id."

FIG. 4C illustrates a V3C parameter set data and a set of bits to be set, or not, depending on whether various types of data are presented in a bitstream to be decoded. In some examples, to accommodate the processing of packed video frame data units, the V3C parameter set is modified to include a "vps_pack_video_enabled_flag 402C." When the flag is set as determined by the pseudocode line 404C, the bitstream to be decoded (e.g., the corresponding video pack video frame data units) includes packed video frames generated by the frame packer 218 of FIG. 2. As described above, the packed video frame flag setter 304 sets the flag by generating (or flipping) a bit included in the metadata to be supplied to the example bitstream formatter. As indicated by the V3C parameter set of FIG. 8, in some examples, when the vps_pack_video_enabled_flag indicates that the corresponding bitstream contains packed video frame data, a decoder that is decoding the bitstream will obtain the packed video frame information (pseudocode line 406C) which includes information needed to unpack the packed video frame. In some examples, information included in the packed video frame information is generated, at least in part, by the pack information generator 316 as described below.

Referring to FIG. 4D illustrates a manner in which to modify a MIV extended profile to account for the presence of packed video frames. In some examples, a "vuh unit type"

of the MIV extended profile is modified to include a fifth bit that, when set, indicates that packed frame video is included in the corresponding video bitstream. In some examples, a syntax value of the profile toolset idc (of a MIV extended profile) is modified to be equal to 65 when packed video frames are included in the video stream being processed. Additionally, a vme embedded occupancy variable is added, can take a value of 0 or 1, and indicates whether the corresponding bitstream includes embedded occupancy data, in which occupancy information is embedded within the geometry component. A vps occupancy video present flag is added, can take a value of 0 or 1, and indicates whether the corresponding bitstream includes occupancy video data. A vps packing enabled flag is also added, and can take a value of 0 or 1, and indicates whether the corresponding bitstream includes packed video frames.

Referring again to FIG. 3, in some examples, the packed video frame information generated by the example packed video information generator 306 includes a set of bits (e.g., 4) that provide an identifier of a set of V3C parameter set data corresponding to a packed video frame. In some examples, the packed video frame information generator 316 generates a unique pack video frame index number for each pack video frame that is generated and supplies the pack video frame index number to the metadata supplier 324 for distribution to the example bitstream formatter 216 In some examples, the information is instead converted to metadata to be included in the corresponding encoded packed video frame.

Referring still to FIG. 3, the example decoder verifier 328 stores flag information in an example flag storage 332 that includes bits corresponding to a set of flags. The flags are identified in the parameter set associated with the packed video frame unit. Each flag included in the set of flags corresponds to a different type of video data (e.g., geometry, auxiliary, attribute, occupancy, etc.) and each flag indicates whether the corresponding type of video data is present in the corresponding packed video frame unit. In some examples, the attribute data can include subcategories of attribute data and the number of subcategories included in the attribute video data is represented using the variable "ai_attribute_count."

In some examples, the number of decodes verifier 328 also includes an example flag adder 334 that sums the number of flags associated with each atlas/atlas tile of the packed video frame unit to determine a total number of the types of video data include in the packed video frame unit. The sum of the flags is the number of decodes decodable by a decoder that is to receiver the encoded video and is equal to a variable "NumDecodes." When the total number of flags have been summed, an example pack video frame checker 336 checks whether a packed video frame video flag indicates that the video unit includes packed video frame units. Provided that the packed video frame video flag indicates that the video unit includes packed video frames, for each packed video frame, an example region deductor 338 deducts from the "NumDecodes" value the number of regions included in each packed video frame minus 1. The number of regions included in each packed video frame is represented by the variable "pi_num_rect[k]−1," where the variable "k" represents a number of a packed video frames included in the total number of packed video frames. Next, the example comparator 340 compares the value of NumDecodes to a value corresponding to a maximum number of decodes that a receiving decoder is able to decode. The maximum number of decodes is represented by the variable. "MaxDecodes." In some examples, the frame packer 218 is preprogrammed with information that identifies, for various types of decoders to which the video stream may be transmitted, a corresponding MaxDecodes value. In some examples, the maximum number of decodes is included in the profile/tier/level syntax information.

Provided that the example comparator 340 determines that the value of NumDecodes is less than or equal to the value of MaxDecodes, then the frame packer 218 can proceed to generate the packed video frames If the comparator 340 determines that the value of NumDecodes is not less than or equal to the value of MaxDecodes, the example encoder 220 will not encode the corresponding video data. Thus, the example number of decoder verifier 328 determines whether the number of decoders required to decode the bitstream being encoded will exceed the constraint MaxDecodes. In some examples, the number of decodes verifier 328 is included in a decoding system to ensure that the decoding system has a sufficient number of decoders. In some examples, the number of decoders that are needed is provided in the parameter data sent by the encoding system of FIG. 2 and the decoding system of FIG. 7 and FIG. 8 simply compares the needed number to available number and, if the available number is insufficient, does not decode the incoming bitstream.

FIG. 5 is pseudocode that can be used by the packed video frame information generator 316 to generate packed video frame information for a set of packed video frames. In some examples, the packed video frames information generated by the packed video frame information generator 316 (for use by the decoder) specifies a number of V3C_PVD units for which region information will be signaled and is represented by the variable "pi_num_packs." The packed video frame information also specifies for each packed video frame, an identifier of the codec (represented as the encoding system 200 in FIG. 2) used to compress the corresponding packed video frame and is represented by the variable "pi_pack_codec_id[k]" where "k" is an index referring to the number of packed video frames. The value of "pi_pack_codec_id" ranges from 0 to 255, inclusive. In some examples, the codec identifier is transmitted to the decoder in a supplement enhancement (SEI) message associated with the packed video frames (e.g., via a component codec mapping SEI message) or via any other means.

In some examples, the packed video frame information also indicates the nominal 2D bit depth to which the packed video frame for the k-th packed video frame shall be converted and is represented by the variable "pi_pack_nominal_2d_bitdepth_minus1[k] plus 1." In some examples, the value of "pi_pack_nominal_2d_bitdepth_minus1[k]" ranges from 0 to 31, inclusive. The nominal 2d bit depth represents the number of bits used to represent the component information. Thus, for example, the geometry data of a packed video frame may be represented by a number of bits "A" and the attribute data corresponding to a same packed video frame may be represented by a number of bits "B." In some such examples, the packed video frame information generator 316 can determine that all components of the packed video frame are to be represented by a same number of bits (e.g., the larger one of the A value and the B value) and any unfilled bit positions can be padded.

The packed video frame information can also indicate the width and height, respectively, of each of packed video frame. The width and height can be represented by the variables "pi_pack_width[k]" and "pi_pack_height[k]," respectively. The packed video frame information also specifies the number of regions included in the k-th packed video frame and is represented by the variable pi_num_rect [k]. The packed video frame information also specifies the vertical (x) and horizontal (y) positions of the top left corner of each region included in each packed video frame in units of "AtlasPatchPackingBlockSize" samples. The variable "AtlasPatchPackingBlockSize" is a unit that represents the size of the blocks included in the Patch of the Atlas currently being processed. All patches, atlas, and atlas tile sizes are an integer multiple of AtlasPatchPackingBlockSize, so the size can be more efficiently represented in those units rather than in single pixels. In some examples, the patches corresponding to an Atlas are configured to be stored in the blocks of the region being operated on. The vertical and horizontal positions can be represented using the variables "pi_rect_pos_x[k][i]" and "pi_rect_pos_y[k][i]."

The packed video frame information also specifies the width and height, respectively, of the regions of each packed video frame in units of "AtlasPatchPackingBlockSize" samples. The width and height of the regions are represented by the variables "pi_rect_width[k][i]" and "pi_rect_height [k][i]," respectively. Conditions can be applied to restrict the locations and size of the regions such that the regions fit within the size of the packed video frame, such as the following: the value of "pi_rect_pos_x[k][i]"+ "pi_rect_width[k][i]" shall be less than or equal to pi_pack_width[k], and the value of pi_rect_pos_y[k][i]+ pi_rect_height[k][i] shall be less than or equal to pi_pack_height[k].

Also, to ensure that none of the regions overlap, the frame packed video frame 218 can include an evaluator 330 to ensure that for all values of "m" and "n," there is at most one value of "i" (representing the index number for a packed video frame) that satisfies the following statement to be evaluated: [(pi_rect_pos_x[k][i]<=m<pi_rect_pos_x[k][i]+ pi_rect_width[k][i])] && [(pi_rect_pos_y[k][i] <=n<pi_rect_pos_y[k][i]+pi_rect_height[k][i])].

The packed video frame information also identifies a rotation (if any) of the i-th region of the k-th packed video frame. The rotation can be represented by the variable "pi_rect_orientation[k][i]." In some examples, the packed video frame generator 314 may rotate a region or multiple regions when including the region(s) in a packed video frame in a manner that results in a packed video frame having a smaller size than would be achieved absent the rotation.

The packed video frame information can also include the atlas or atlas tile identifier (ID) of the i-th region of the k-th packed video frame, and is represented by the variable "pi_rect_atlas_id[k][i]." The atlas ID identifies which of a plurality of atlases is the source of the data stored in the corresponding rect.

In some examples, the packed video frame information also identifies which of a number of maps (each represented by a different "map index" number) is associated with the i-th region of the k-th packed video frame. The map index number to be used to identify the map is represented by the variable "pi_rect_map_index[k][i]."

In some examples, the packed video frame information includes a flag that identifies whether the i-th region of the k-th packed video frame includes auxiliary video data. In some examples, the variable "pi_rect_auxiliary_video_flag [k][i]" represents the auxiliary video flag of the i-th region of the k-th packed video frame.

The packed video frame information also specifies the V3C type of the data contained in the i-th region of the k-th packed video frame atlas. The V3C type of data can be represented by the variable "pi_rect_type_id[k][i]." In some examples, the value of "i_rect_type_id[k][i]" spans from 2-4. In some examples, the V3C type of the data contained in the region can be occupancy type, a geometry type, an attribute type, etc.

In the packed video frame information, a variable "pi_rect_attr_index[k][i]" specifies an attribute index of i-th region of the k-th packed video frame. The attribute index represents which of multiple types of attribute data is contained in the i-th region. In some examples, there are various types of data that are classified as attribute data and the various types are numbered in an index such that the index number of an attribute reflects a type of attribute data included in the i-th region.

The "pi_rect_attr_partition_index[k][i]," when present, specifies the attribute partition index of i-th region of the k-th packed video frame. When not present, the value of "pi_rect_attr_partition_index[k][i] is inferred to be equal to 0. The attribute partition index identifies which of a set of subcategories of attribute types are included in the attribute.

Thus, the variables identified above represent examples of the packed video frame information generated by the example pack information generator 316 before, during and/or after the generation of a packed video frame. Further, as described, the packed video frame information is supplied to the bit stream formatter and to the multiplexer for multiplexing with the corresponding packed video frame in accordance with a standard governing the operation of the encoding system 200.

Referring still to FIG. 5, in some examples, the packed video frame information generator 316 generates the packed video frame information for each packed video frame of a number of k packed video frames by generating the packed video frame codec index number, the packed video frame nominal 2D bitdepth minus 1, the packed video frame width, the packed video frame height and the number of regions to be included in a packed video frame. Next, for each region included in each region, the packed video frame information generator 316 generates a region position of the region within a packed video frame as an x, y position in in the packed video frame. The packed video frame information generator 316 also generates a width, a height, an orientation, an atlas index number and/or an atlas tile index number, a data type index number, a map index number, an auxiliary data flag (to be set when auxiliary data is included in the region), and an attribute index number. Next, the evaluator 330 of FIG. 3 can be used to determine if the value of attribute dimension partitions minus 1 multiplied by the value of the atlas index number (or the atlas tile index number) multiplied by the attribute index number is greater than zero. If so, the packed video frame information generator 316 generates a region attribute partition index number for the attribute data. The packed video frame information generator 316 continues for a next region included in the packed video frame until data has been generated for all regions of the packed video frame. Then, the packed video frame information generator 316 selects a next set of incoming geometry, attribute and/or occupancy data and generates the data described above for a next packed video frame. The region information is generated for each region included in the next packed video frame, in the manner described above and the packed video frame information generator 316 continues in this manner until the incoming video stream or video stream sequence has been encoded FIG. 6 illustrates information to be generated by the packed video frame information generator 316 when packed video frame independent region SEI messages are used to identify a correspondence between regions of a packed video frame and independently decodable regions in a video sub-bitstream. In addition, FIG. 6 is pseudocode that can be used to generate SEI messages to indicate the correspondence of regions of a packed video frame to independently decodable regions in a video sub-bitstream. In some such examples, the example packed video frame information generator 316 can generate signaling to be included in packed video frame independent regions SEI messages. Thus, the example packed video frame information generator 316 generates a set of variables, such as those included in the pseudocode of FIG. 6. In some examples, the set of variables includes a variable "pir_num_pack" that represents a number of packed video frames for which independently decodable region information is signaled. A variable "pir_description_type_idc[k] equal to 0" indicates that tile indices of the top left and bottom right tiles of an independently decodable region (such as a temporal motion-constrained tile set) are signaled for the regions of the k-th packed video frame. Based on some encoding standards, an atlas can be sub-divided into tiles and can be operated on in the tile form. A variable "pir_description_type_idc equal to 1" indicates that sub pictures IDs are signaled for the regions of the k-th packed video frame." The variable "pir_description_type_idc[k]" is in the range of 0 to 1. Other values (e.g., values in the range of 2 . . . 3) can be reserved for future use.

In some examples, a variable "pir_num_rect[k]" specifies the number of regions of the k-th packed video frame for which independently decodable region information is signaled. A set of variables "pir_top_left_tile_idx[k][i]" and "pir_bottom_right_tile_idx[k][i]," when present, identify the tile indices of the top-left tile and the bottom-right tile of an independently decodable region (such as a temporal motion-constrained tile set), respectively, in tile raster scan order, corresponding to the i-th region of the video sub-bitstream of the k-th packed video frame. A variable "pir_subpic_id[k][i]," when present, identifies the subpicture ID corresponding to the i-th region of the video sub-bitstream of the k-th packed video frame.

Referring still to FIG. 6, in some examples, information identifying a packed video frame independent region (pir) can be generated by the packed video frame information generator using the pseudocode of FIG. 6. In some such examples, for each packed video frame of a number of packed video frames, "k," for which information corresponding to an independently decodable region is signaled, the packed video frame information generator generates packed video frame information. In some such examples, a pir description type is obtained that (as described above) when equal to 0 indicates that tile indices of the top left and bottom right tiles of the pir independently decodable region (such as a temporal motion-constrained tile set) are signaled for the regions of the k-th pir packed video frame. Next, the packed video frame information generator determines based on, for example, a packed video frame configuration, a number of regions of the k-th pir packed video frame for which independently decodable region information is to be signaled. Then, for each packed video frame having a pir description type equal to zero, the packed video frame information generator generates/determines the tile indices of the top left and bottom right tiles of the pir independently decodable region, corresponding to each of the i regions of the video sub-bitstream of the k-th packed video frame. When the value of the variable pir_description_type_idc is equal to 1, the packed video frame information generator, for each region of each pir packed video frame, generates sub-pictures IDs.

Figure 7:
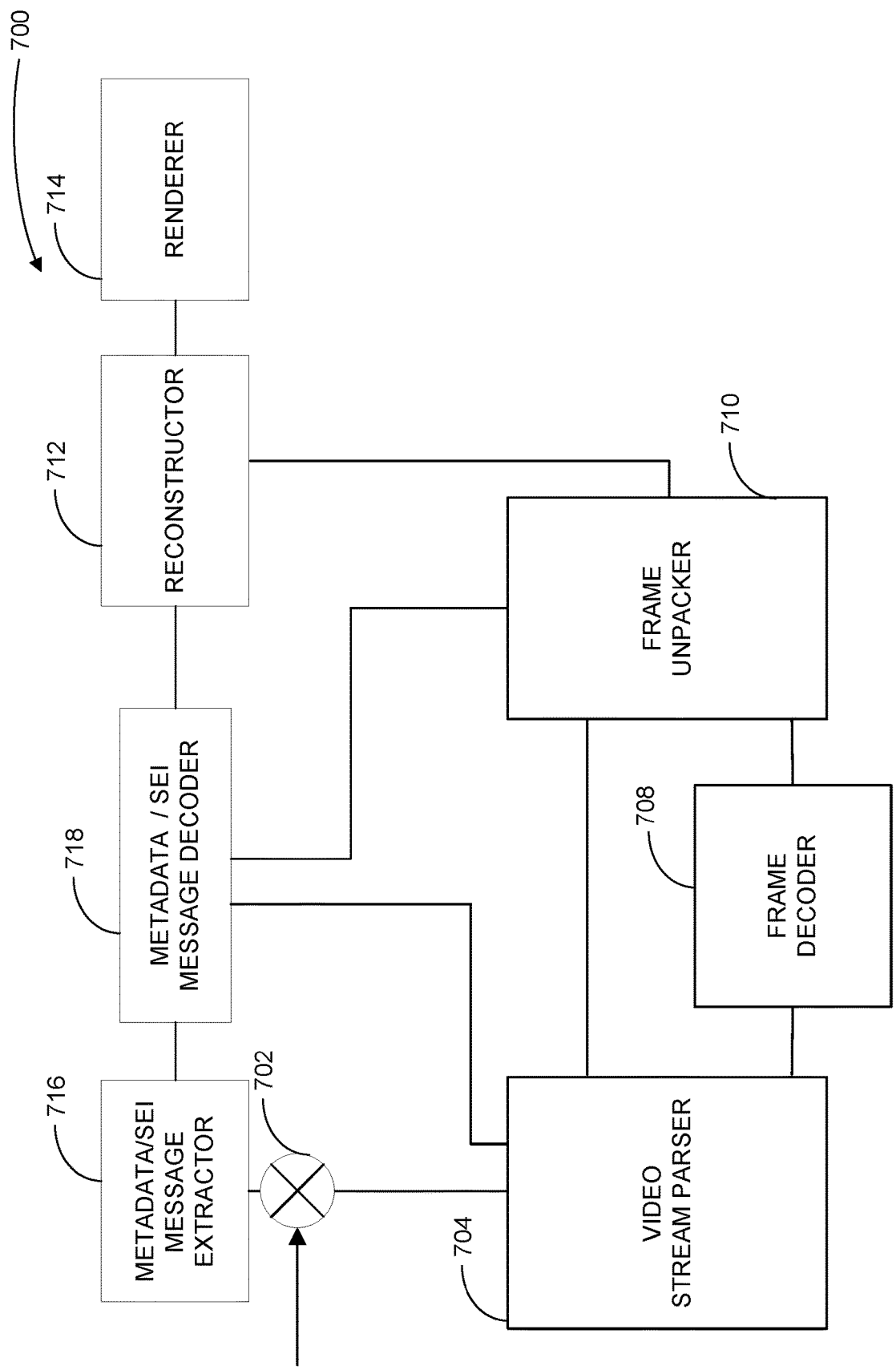
FIG. 7 is a block diagram of an example decoder having an example frame unpacker in accordance with the invention.

FIG. 7 is a block diagram of a portion of an example packed video frame video decoding system 700. In some examples, the packed video frame video decoding system 700 includes an example demultiplexer 702, an example packed video frame video stream parser 704, an example frame decoder 708, an example frame unpacker 710, an example reconstructor 712, an example renderer 714, an example metadata/SEI message extractor 716, and an example metadata/SEI message decoder 718.

In some examples, the example demultiplexer 702 receives an encoded video stream from the multiplexer of the video encoding system 200 of FIG. 2. The demultiplexer 702 separates the metadata/SEI messages from the encoded video stream and supplies the separated information to the example metadata/SEI message extractor 716. In some examples, the metadata/SEI message extractor 716 examines the extracted information to identify SEI messages included in the extracted information and to identify individual data fields and the associated data corresponding to the video stream parser 704. In some examples, the video stream parser 704 uses vuh unit headers ("vuh_pack_index") corresponding to units of the packed video frame sub-bitstream to identify units that contain packed video frames. In some examples, the video stream parser 704 identifies a codec (using a variable "pi_pack_codec_id"). In some examples, the values of the variables vuh_pack_index and pi_pack_codec_id are provided to the video stream parser 704 by the example metadata/SEI message decoder 718. In some examples, the vuh_pack_index and the pi_pack_codec_id information can be included in the packed video frame sub-bitstream.

In some examples, the video stream parser 704 uses information supplied by the metadata/SEI message decoder 718 to identify a unit of the sub-bitstream that corresponds to a packed video frame and to identify information corresponding to the unit. In some examples, the information supplied by the metadata/SEI message decoder 718 includes, for each packed video frame, a color component index, a bitdepth, a packed video frame width, and a packed video frame height. In addition, the metadata/SEI message decoder 718 supplies a number of map streams associated with the packed video frame and obtains, if needed, the map count associated with a pack frame currently being operated on.

In some examples, the example video stream parser 704 uses the collected/determined information to assign values to a set of variables associated with the decoded packed video frames including: 1) "decPackFrame[frameIdx][compIdx][y][x]"), 2) "decPackBitdepth[frameIdx]," 3) "decPackWidth[frameIdx]" and 4) "decPackHeight[frameIdx]," and 5) "mapIdx." The value represented by the variable "frameIdx" is the index of the decoded packedvideo frame, the value represented by the variable "compIdx" is the color component index. The variable "y" is a row index in the decoded packed video frame and is in the range of 0 to the value represented by the variable "decPackHeight[frameIdx]−1," inclusive, and the variable "x" is a column index in the decoded frame and is in the range of 0 to "decPackWidth[frameIdx]−1," inclusive. The value of the map index ("mapIdx") falls within a range that begins at zero and extends to the value to which the following statement evaluates: "vps_multiple_map_streams_present_flag?vps_map_count_minus1: 0," inclusive. In some examples, the statement above evaluates to the value of the variable "vps_mpa_count_minus 1" when the value of the variable "vps_multiple_map_streams_present_flag," is true (or not equal to zero), and otherwise evaluates to zero. The variable "vps_map_count_minus1" is a value representing the number of maps included or otherwise associated with a packed video frame with which the current packed video frame unit is associated.

In some examples, the packed video frame information is included with the packed video frames and is parsed by the video stream parser 704 at which the packed video frame information is parsed from the encoded video. The encoded video is supplied to the example frame decoder 708 for decoding and the example packed video frame information is supplied to the frame unpacker 710. In some examples, the frame decoder 708 decodes the packed video frame unit(s) in accordance with any video decoding standard and supplies the resulting decoded packed video frame unit(s) to the example frame unpacker 710. The frame unpacker 710 unpacks the packed video frame unit using packed video frame information associated with the decoded packed video frames, the variables identified by the video stream parser 704, etc., to unpack the decoded packed video frame unit(s). Information extracted from the unpacked frames is then supplied to reconstructor 712 to reconstruct the original 3D image for rendering at the renderer 714 are supplied. In some examples, the frame unpacker 710 operates to use the packed frame information to identify regions, region characteristics, identify blocks of regions, and/or maps to be used to map the blocks into a volumetric video sequence in real time or near real time for display by a renderer. In some such examples, the frame unpacker 710 deploys the operations described with respect to the decoding system of FIG. 8 but does not necessarily perform the operations in a same order or in exactly the same manner.

FIG. 8 is a block diagram of the example metadata/SEI message decoder 718, the example frame unpacker 710, and the example reconstructor 712, all of which are also shown in FIG. 7. The metadata/SEI message decoder 718, as described above, decodes information (including pack video frame information associated with the packed video frame unit(s) to be unpacked) used to identify the packed video frame unit, an atlas data header corresponding to the packed video frame unit, decoded patch units of the packed video frame unit, a decoded block-to-patch map, etc.

In some examples, the example frame unpacker 710 includes an example reg (region) counter 801, an example variable value setter 802, an example packed video frame unit fetcher 804, an example reg type determiner 806, an example reg selector 807, an example reg extractor 808, an example reg height and reg width incrementer 810, an example reg positioning determiner 812, and an example mapper 814.

In some examples, the example pack video frame unit fetcher 804 receives and/or fetches (from the frame decoder 708 of FIG. 7) a packed video frame unit to be processed. In some examples, there are "k" packed video frames included in the packed video frame unit and each of the k packed video frames are operated on by the blocks of the frame unpacker 710 in the manner described as follows. In some examples, the packed video frame unit fetcher 804 does not receive (or fetch) the frame but rather receives information regarding the location of the packed frame video within the packed video supplied by the decoder.

Individual ones of the packed video frames are referred to as the k-th packed video frame and the value of k is implemented each time a packed video frame has been processed by the frame unpacker 710. In some examples, the example region selector 807 selects one of a set of "i" regions associated with the k-th packed video frame. Individual ones of the regions are referred to as the i-th rect.

Next, the atlas index number (or atlas tile index number) corresponding to the i-th region of the k-th packed video frame is identified and the map identifier corresponding to the i-th region of the k-th packed video frame is identified. As described above, in some examples, the packed video frame information is received from the metadata/SEI message decoder 718, and/or an examination of the packed video frame unit and/or from the information supplied by the frame decoder 708, and is used to identify the regions from which the i-th region is to be selected.

In some examples, the position of a block within the selected i-th region is determined by the example region positioning determiner 812. The determined position is represented by the variables "x, y," wherein the value of x is the vertical position of the block within the region and y is the horizontal position of the block within the region. In some examples, the blocks correspond to equally sized squares contained in the region such that all of the blocks together form the region. Next, the frame index number and the component index number of the packed video frame unit currently being operated on (e.g., the frame in which the i-th region of the k-th packed video frame is inserted) are obtained.

In some examples, the region type determiner 806 determines a type of video data contained in the i-th region of the k-th packed video frame (e.g., occupancy data, geometry data, attribute data, etc.). In some examples, when the region type determiner 806 determines the data type, the region type determiner 806 also generates information indicating that the type of data residing at the x, y position of the i-th region of the k-th packed video frame is the type of data determined by the region type determiner. In some examples, the example frame unpacker 710 supplies the decoded video data of the i-th region of the k-th packed video frame as well as the corresponding, collected information as output to the example reconstructor 712. In some examples, the output provided to the reconstructor 712 includes the atlas index number of the i-th region, the map index number of the i-th region, the frame index number of the current packed video frame unit, the component index number, and the x, y position information. The example reconstructor 712 uses the information to place the corresponding raw video data into an image being reconstructed. In some examples, when the type of data is determined to be attribute data, the frame unpacker 710 generates the information identified above as well as an attribute index number that identifies which of a variety of attributes reside at the indicated position. In some examples, after the information output is generated, the frame unpacker 710 performs the same operations for a next block at a next position (e.g. (x+1, y=1) of the i-th region of the k-th packed video frame. In some examples, after all of the blocks of the i-th region have been processed, a next region (e.g., (i+1)-th region of the k-th packed video frame is processed in the manner described above. Similarly, when all of the regions of a packed video frame have been operated on, a next packed video frame (e.g., (k+1)-th packed video frame unit is obtained and the operations of the frame unpacker 610 are repeated. In some examples, when all of the packed video frames of a pack video frame unit have been processed, a next set of packed video frames associated with another packed video frame unit are processed as described above. In some examples, when all of the packed video frames of a packed video frame unit have been operated on, the packed video frame unit fetcher 804 responds by fetching or receiving a next packed video frame unit and associated information from the video decoder.

In some examples, for a block of a region having occupancy type data, the frame unpacker 610 generates a variable "decOccFrame[atlasIdx][mapIdx][frameIdx][compIdx][y][x]" and the values corresponding thereto. For a block of a region having geometry type data, the frame unpacker 610 generates a variable "decGeoFrame[atlasIdx][mapIdx][frameIdx][compIdx][y][x])," and the variables corresponding thereto. Likewise, for a block of a region having attribute data, the frame packer 610 generates a variable: ("decAttrFrame[atlasIdx][attrIdx][mapIdx][partIdx][frameIdx][compIdx][y][x]") and the data corresponding thereto. As described above, this information is used by the reconstructor 712 to reconstruct the view represented by the packed video frame units. In some examples, the frame unpacker can be implemented by the example pseudocode of FIG. 9.

While an example manner of implementing the encoding system 200 of is illustrated in FIG. 2 and FIG. 3, one or more of the elements, processes and/or devices illustrated in FIG. 2 and FIG. 3 may be combined, divided, re-arranged, omitted, eliminated and/or implemented in any other way. Further, the example captured video data and metadata storage 202, the example video and metadata pre-processor 204, the example parameter/atlas data supplier 206, the example geometry video data supplier 208, the example attribute video data supplier 210, the example occupancy video data supplier 212, the example bitstream formatter 216, the example frame packer 218, the example encoder 220 and the example multiplexer 222, the example profile/tier/level storage 302, the example packed video flag setter 304, the example pack configuration selector 306, the example atlas identifier 307, the example geometry region generator 308, the example attribute region generator 310, the example occupancy region generator 312, the example pack generator 314, the example pack information generator 316, the example metadata storage 318, the example pack storage 322, the example metadata supplier 324, the example pack supplier 326, the example decoder verifier 328, the example evaluator 330, the example flag storage 332, the example flag setter 333, the example flag adder 334, the example pack video checker 336, the example region deductor 338, and the example comparator 340, and/or, more generally, the example encoding system 200 of FIG. 2 and FIG. 3 may be implemented by hardware, software, firmware and/or any combination of hardware, software and/or firmware. Thus, for example, any of the example captured video data and metadata storage 202, the example video and metadata pre-processor 204, the example parameter/atlas data supplier 206, the example geometry video data supplier 208, the example attribute video data supplier 210, the example occupancy video data supplier 212, the example bitstream formatter 216, the example frame packer 218, the example encoder 220 and the example multiplexer 222, the example profile/tier/level storage 302, the example packed video flag setter 304, the example pack configuration selector 306, the example atlas identifier 307, the example geometry region generator 308, the example attribute region generator 310, the example occupancy region generator 312, the example pack generator 314, the example pack information generator 316, the example metadata storage 318, the example pack storage 322, the example metadata supplier 324, the example pack supplier 326, the example decoder verifier 328, the example evaluator 330, the example flag storage 332, the example flag setter 333, the example flag adder 334, the example pack video checker 336, the example region deductor 338, the example comparator 340 and/or, more generally, the example encoding system 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example captured video data and metadata storage 202, the example video and metadata pre-processor 204, the example parameter/atlas data supplier 206, the example geometry video data supplier 208, the example attribute video data supplier 210, the example occupancy video data supplier 212, the example bitstream formatter 216, the example frame packer 218, the example encoder 220 and the example multiplexer 222, the example profile/tier/level storage 302, the example packed video flag setter 304, the example pack configuration selector 306, the example atlas identifier 307, the example geometry region generator 308, the example attribute region generator 310, the example occupancy region generator 312, the example pack generator 314, the example pack information generator 316, the example metadata storage 318, the example pack storage 322, the example metadata supplier 324, the example pack supplier 326, the example decoder verifier 328, the example evaluator 330, the example flag storage 332, the example flag setter 333, the example flag adder 334, the example pack video checker 336, the example region deductor 338, and the example comparator 340 is/are hereby expressly defined to include a non-transitory computer readable storage device or storage disk such as a memory, a digital versatile disk (DVD), a compact disk (CD), a Blu-ray disk, etc. including the software and/or firmware. Further still, the example encoding system 200 of FIG. 2 and FIG. 3 may include one or more elements, processes and/or devices in addition to, or instead of, those illustrated in FIG. 2 and FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the encoding system 200 of FIG. 2 and FIG. 3 are shown in FIG. 10A, FIG. 10B, FIG. 11, and FIG. 12. The machine readable instructions may be one or more executable programs or portion(s) of an executable program for execution by a computer processor and/or processor circuitry, such as the processor 1600 shown in the example processor platform 1600 discussed below in connection with FIG. 16. The programs may be embodied in software stored on a non-transitory computer readable storage medium such as a CD-ROM, a floppy disk, a hard drive, a DVD, a Blu-ray disk, or a memory associated with the processor 1612, but the entire programs and/or parts thereof could alternatively be executed by a device other than the processor 1612 and/or embodied in firmware or dedicated hardware. Further, although the example programs are described with reference to the flowcharts illustrated in FIG. 10A, FIG. 10B, FIG. 11, and FIG. 12, many other methods of implementing the example encoding system 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 10A, 10B, 11 and 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

While an example manner of implementing the decoder 700 is illustrated in FIG. 7 and FIG. 8, one or more of the elements, processes and/or devices illustrated in FIG. 7 and FIG. 8 may be combined, divided, re-arranged, omitted, eliminated and/or implemented in any other way. Further, the example demultiplexer 702, the example packed video stream parser 704, the example frame decoder 708, the example frame unpacker 710, the example reconstructor 712, the example renderer 714, the example metadata/SEI message extractor 716, and the example metadata/SEI message decoder 718, the example region counter 801, the example variable value setter 802, the example pack frame unit fetcher 804, the example region type determiner 806, the example region selector 807, the example region extractor 808, the example region height and region width incrementer 810, and the example region positioning determiner 812, the example mapper 814 and/or, more generally, the example decoder 700 of FIG. 7 and FIG. 8 may be implemented by hardware, software, firmware and/or any combination of hardware, software and/or firmware. Thus, for example, any of the example demultiplexer 702, the example packed video stream parser 704, the example frame decoder 708, the example frame unpacker 710, the example reconstructor 712, the example renderer 714, the example metadata/SEI message extractor 716, and the example metadata/SEI message decoder 718, the example region counter 801, the example variable value setter 802, the example pack frame unit fetcher 804, the example region type determiner 806, the example region selector 807, the example region extractor 808, the example region height and region width incrementer 810, and the example region positioning determiner 812, the example mapper 814, and/or, more generally, the example decoder 700 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example demultiplexer 702, the example packed video stream parser 704, the example frame decoder 708, the example frame unpacker 710, the example reconstructor 712, the example renderer 714, the example metadata/SEI message extractor 716, and the example metadata/SEI message decoder 718, the example region counter 801, the example variable value setter 802, the example pack frame unit fetcher 804, the example region type determiner 806, the example region selector 807, the example region extractor 808, the example region height and region width incrementer 810, the example region positioning determiner 812, and the example mapper 814 is/are hereby expressly defined to include a non-transitory computer readable storage device or storage disk such as a memory, a digital versatile disk (DVD), a compact disk (CD), a Blu-ray disk, etc. including the software and/or firmware. Further still, the example decoder 700 of FIG. 7 and FIG. 8 may include one or more elements, processes and/or devices in addition to, or instead of, those illustrated in FIG. 7 and FIG. 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 14:
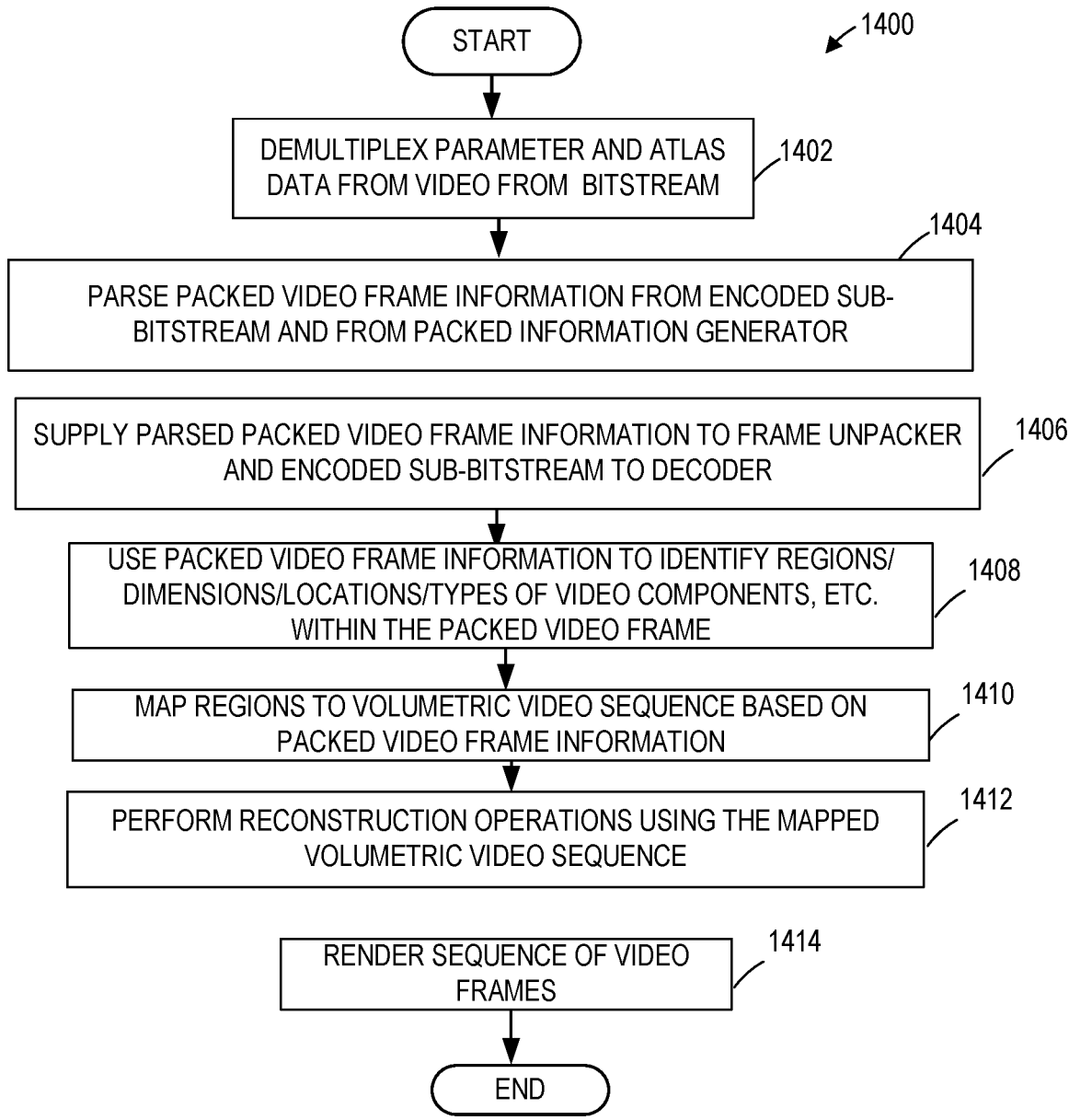
FIG. 14 is a flowchart illustrating an example program to implement the decoder of FIG. 7 and FIG. 8.
Figure 15:
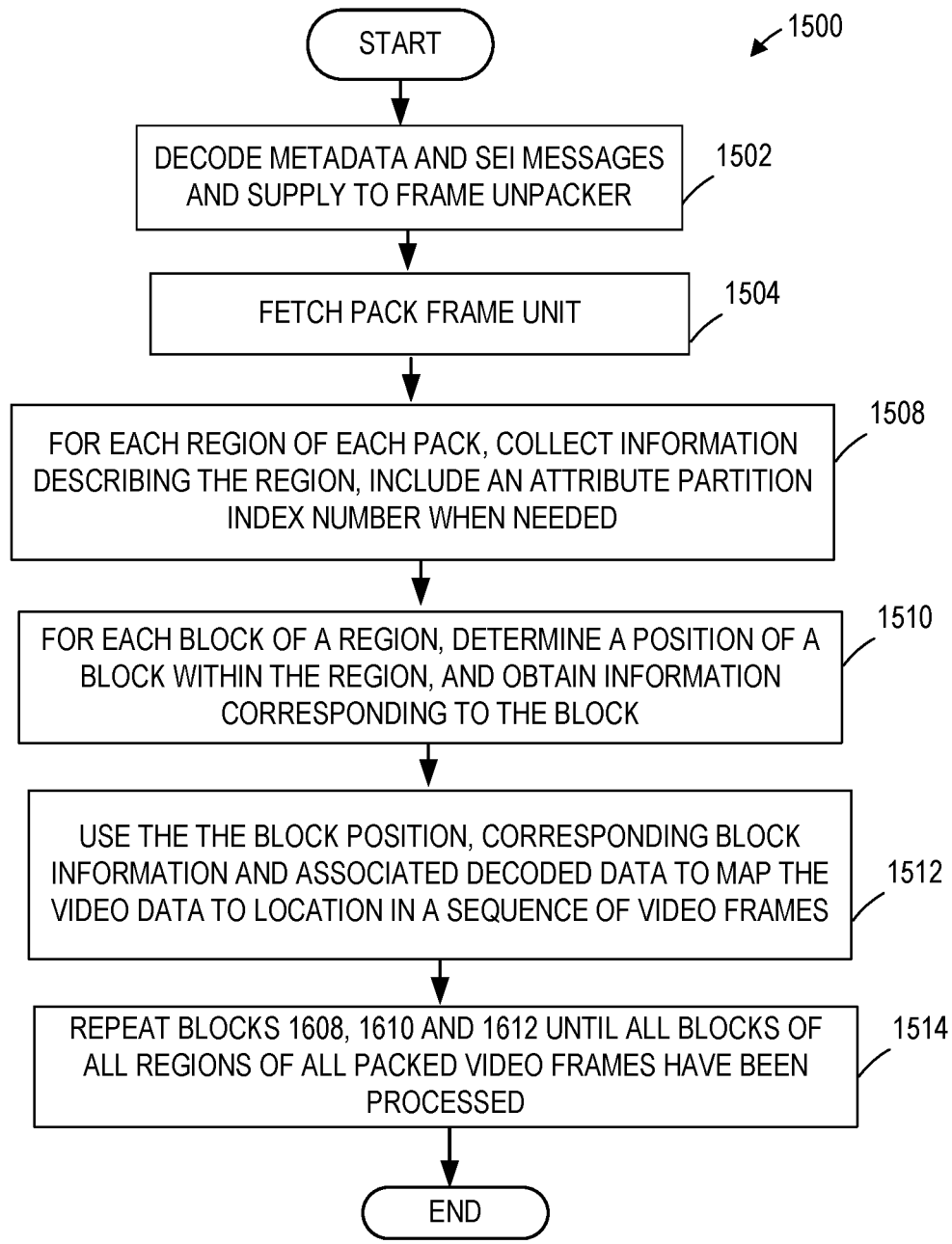
FIG. 15 is a flowchart illustrating an example program to implement the frame unpacker of FIG. 7 and FIG. 8.

Flowcharts representative of example hardware logic, machine readable instructions, hardware implemented state machines, and/or any combination thereof for implementing the decoder 700 of FIG. 7 and FIG. 8 are shown in FIG. 14, and FIG. 15. The machine readable instructions may be one or more executable programs or portion(s) of an executable program for execution by a computer processor and/or processor circuitry, such as the processor 1712 shown in the example processor platform 1700 discussed below in connection with FIG. 17. The programs may be embodied in software stored on a non-transitory computer readable storage medium such as a CD-ROM, a floppy disk, a hard drive, a DVD, a Blu-ray disk, or a memory associated with the processor 1712, but the entire programs and/or parts thereof could alternatively be executed by a device other than the processor 1712 and/or embodied in firmware or dedicated hardware. Further, although the example programs are described with reference to the flowcharts illustrated in FIG. 14, and FIG. 15, many other methods of implementing the example decoder 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 14 and 15 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 10A:
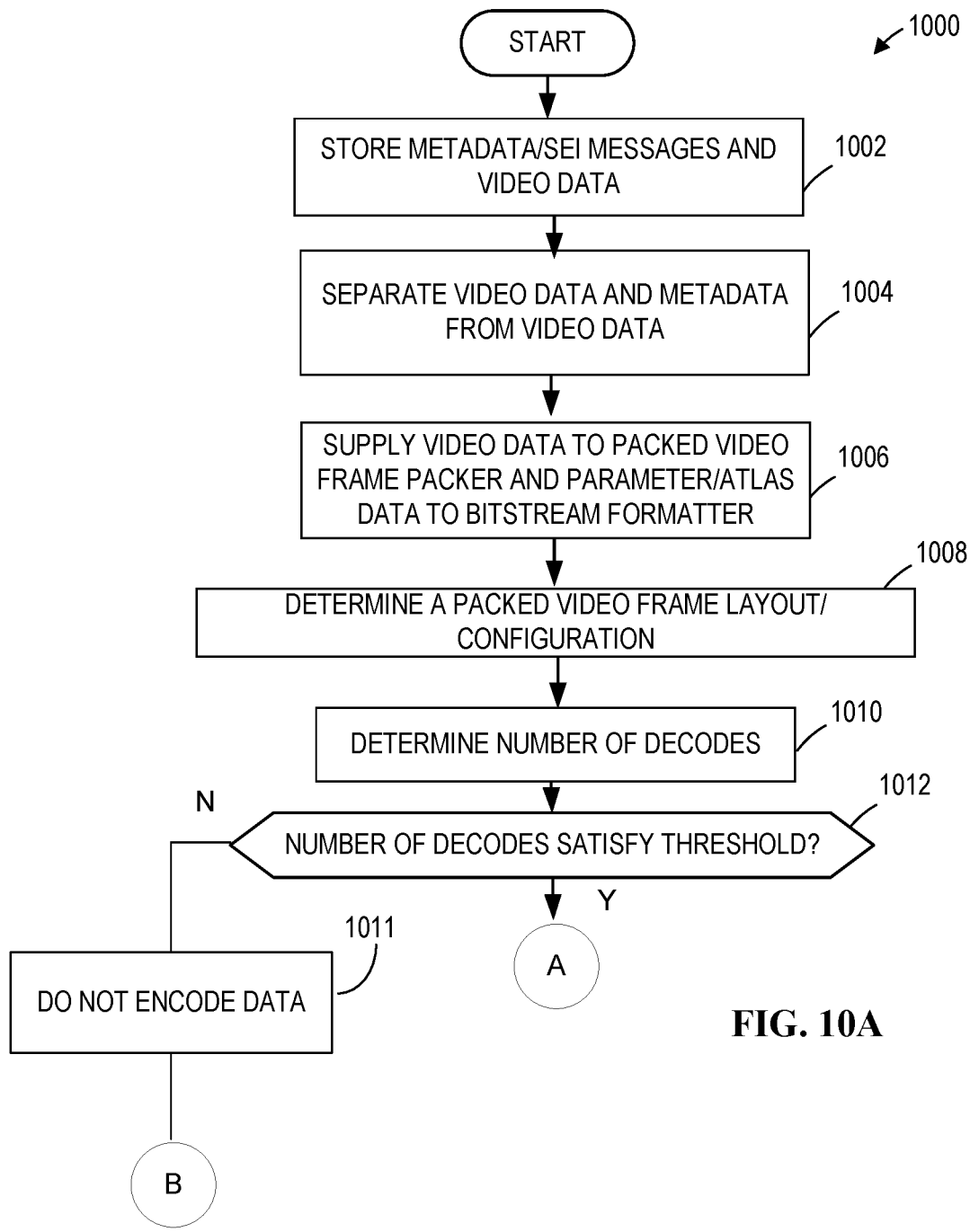
FIG. 10A and FIG. 10B is a flowchart illustrating an example program to implement the example encoder of FIGS. 2 and 3.
Figure 10B:
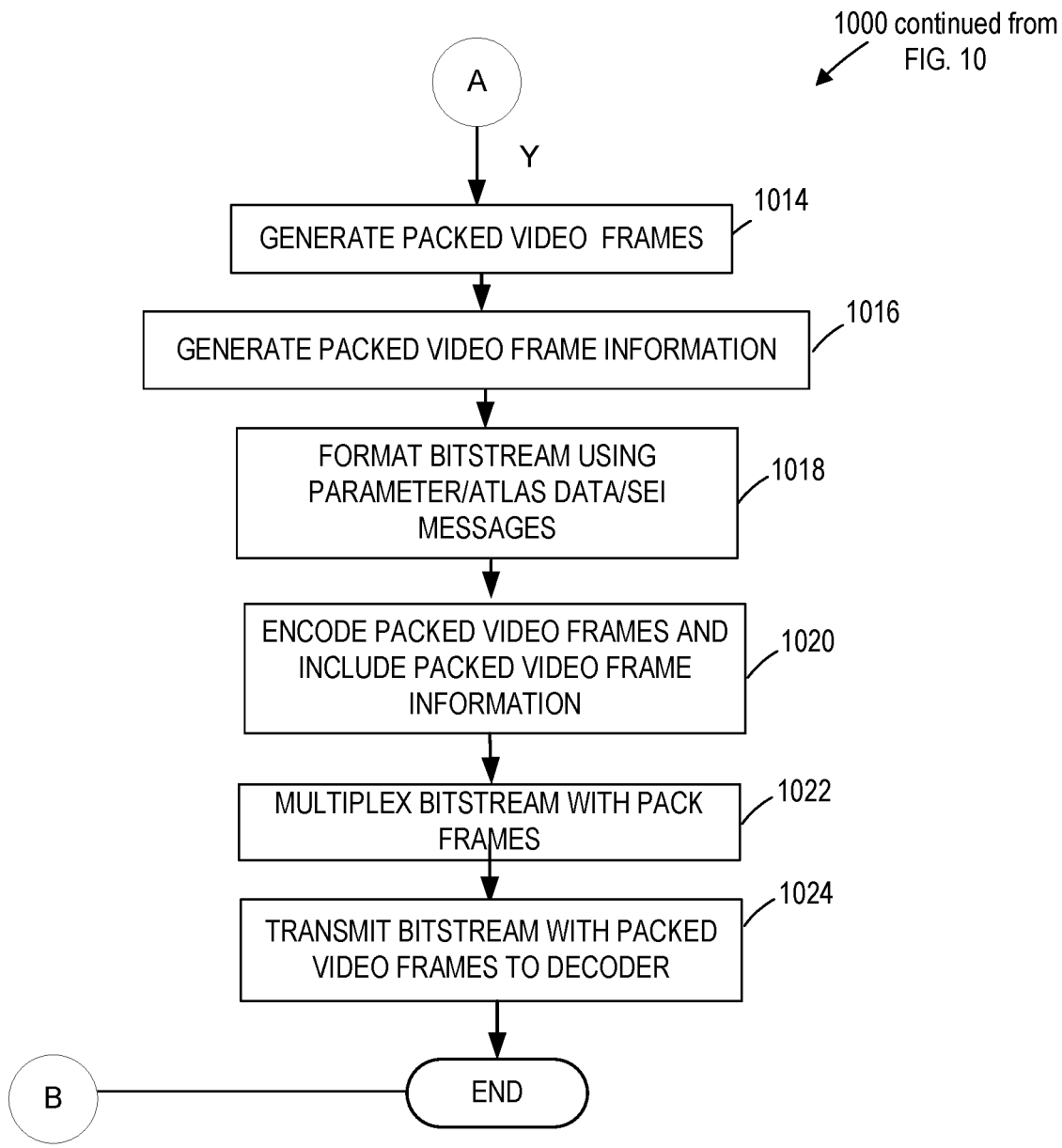

FIGS. 10A and 10B illustrate a program that can be performed to implement the example encoding system 200 of FIG. 2. The program of FIG. 10 includes a block 1002 at which captured video data and parameter/atlas data is stored in the example captured video data and metadata storage 202. The example video and metadata pre-processor 204 separates the parameter/atlas data from the different types of video included in the video data (e.g., geometry, attribute, occupancy, etc.). (Block 1004) Next, the different types of video data are supplied via the video data suppliers 208, 210, and 212 to the packed video frame packer 218 and the parameter and atlas data are supplied to the bitstream formatter 216 via the parameter and atlas data supplier 206. (Block 1006)

The example packed video frame packer 218 determines a packed video frame configuration based, in part, on the types and size of the video data supplied by the video data suppliers 208, 210, 212 or based on any of a variety of other factors. (Block 1008). In some examples, as described with reference to FIG. 3, the example packed video frame packer 218 determines the number of decodes required to decode the bitstream generated by the encoding system 200 (Block 1010). The packed video frame packer 218 tests to determine whether the number of decodes will satisfy a threshold (e.g., will be less than or equal to a maximum number of decodes). (Block 1012). In some examples, when the maximum number of decodes is exceeded, the packed video frame packer 218 does not encode the video and the program ends.

When the maximum number of decodes is satisfied, (e.g., the number of decodes is less than or equal to the maximum number of decodes), the packed video frame packer 218 generates packed video frames. (Block 1014).

In some examples, when generating (or before or after generating) the packed video frames, the example packed video frame packer 218 (FIG. 2) generates packed video frame information (Block 1016). In some examples, the packed video frame includes the packed video frame in addition to the types of data included in the regions of the packed video frame. In some examples, the packed video frame information includes any of a variety of information about the packed video frame including, the regions included therein, the types of video components in each of the regions and the atlas or atlas tile corresponding to each of the regions. The bitstream formatter 216 (FIG. 2) formats the parameter/atlas data (as well as any SEI messages that apply to the packed video frames) (Block 1018). In some examples, the parameter data can include parameter data corresponding to the camera views of the video used to generate the packed video frames and/or camera related data identifying, for example, a number of cameras from which data is being collected, a view associated with each of the cameras, etc. In some examples, as described above, packed video frame information can include information regarding the packed video frames collectively, the individual packed video frames, the individual regions included in each of the packed video frames, the dimensions of the regions, etc. The packed video frames are encoded at the encoder 220 (Block 1020), and the example multiplexer 222 operates to multiplex the bitstream information with the encoded packed video frames. (Block 1022). The multiplexed bitstream is then transmitted to a decoder (Block 1024) and the program ends.

Figure 11:
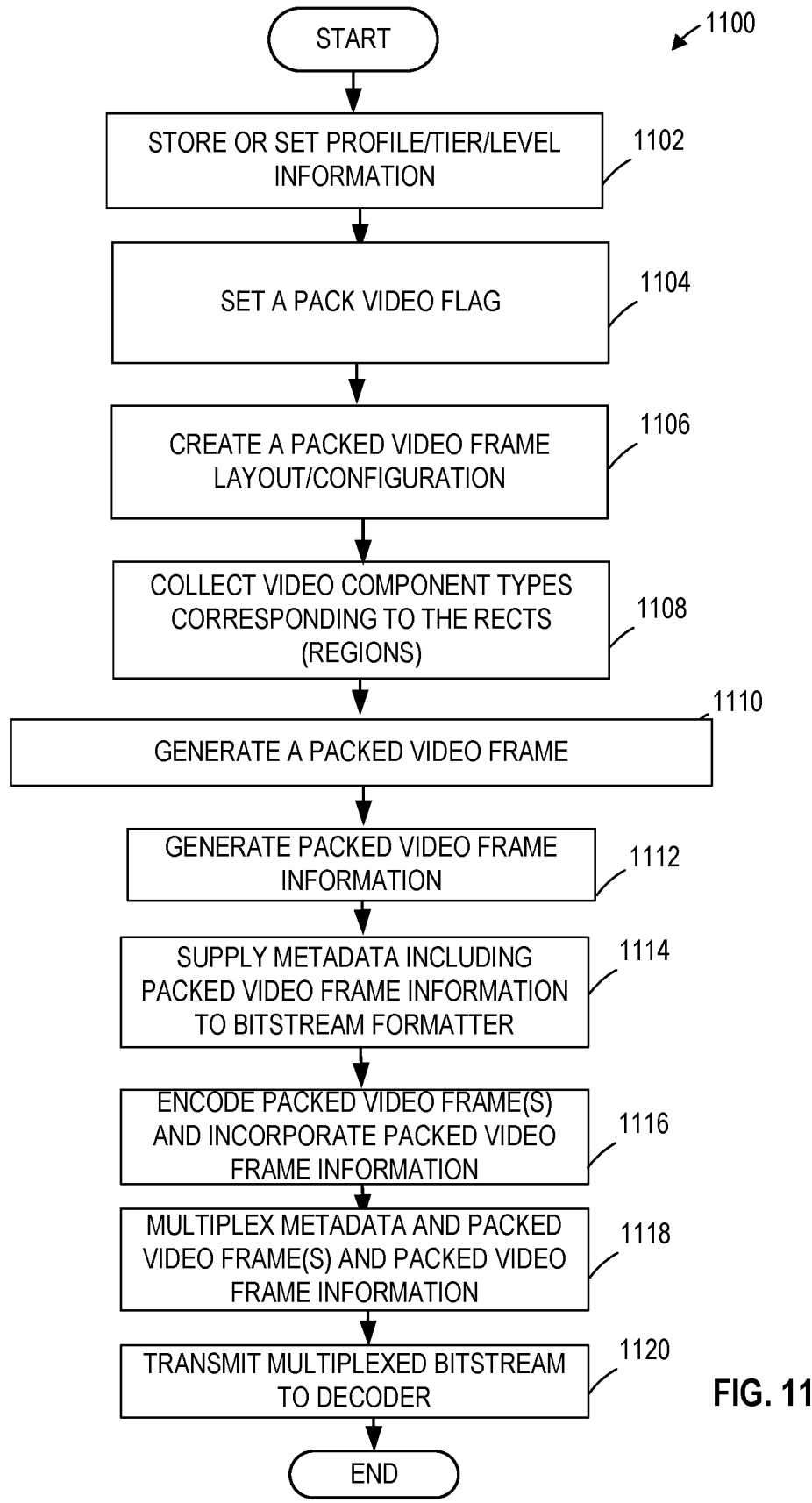
FIG. 11 is a flowchart illustrating an example program to implement the frame packer, the encoder and the multiplexer of FIG. 2 and FIG. 3.

FIG. 11 is a program 1100 to implement the example packed video frame packer 218 of FIG. 2 and FIG. 3. The program 1100 begins at a block 1102 at which profile/tier/level information is stored in a profile/tier/level storage. Next, the example packed video flag setter 304 sets a video flag indicating that packed video frame data is to be processed. (Block 1104). In some examples, setting the pack video flag includes setting one or more bits in the metadata storage 318. In some examples, based on the information in the profile/tier/level storage 302 or based on information supplied by any of the other blocks of FIG. 2, the packed video frame configuration selector 306 determines video frame configuration/layout. (Block 1106). In some examples, any of the packed video frame configurations illustrated in FIG. 1A, FIG. 1B, and/or FIG. 1C can be selected. In some examples, any of a variety of configurations other than (or in addition to) the configurations of FIG. 1A, FIG. 1B and FIG. 1 can be determined.

Next, the geometry region generator 308 generates a geometry rect/reg, the attribute region generator 310 generates a region and the example occupancy region generator 312 generates an occupancy rect. (Block 1108). In some examples, the packed video frame generator 314 uses the selected packed video frame configuration and the generated regions to generate a packed video frame(s) (or insert the regions into one or more packed video frames according to the selected packed video frame configuration). (Block 1110). In some examples, the packed video frame generated identifies the location of the regions in the volumetric video being encoded and associated the location (and other information) with the location of the volumetric video in the bitstream. In addition, the packed video frame information generator 316 generates packed video frame information about each packed video frame that is created by the packed video frame generator 314, as described above. (Block 1112). The packed video frame information can be stored in the metadata storage 318. In some examples, the metadata supplier 324 supplies the metadata (packed video frame information, parameter/atlas data, etc., corresponding to a packed video frame (or multiple packed video frames) to the example bitstream formatter 2016 of FIG. 2. (Block 1114). In some examples, the packed video frame is attached or otherwise associated with the corresponding packed video frames to be encoded. In some examples, the example packed video frame supplier 326 supplies the packed video frames (obtained from the pack storage 322) to the example encoding system 200 of FIG. 2A at which the packed video frames are encoded (Block 1116). In addition, the packed video frame information can be associated with the encoded pack frames. In addition, the example multiplexer causes the bitstream of metadata to be multiplexed with the corresponding encoded data for transportation to a decoder for decoding and rendering (Block 1118) and the multiplexed stream is transmitted to a decoder (Block 1120). Thereafter the program 1100 is repeated or ends.

In some examples, the packed video frame generator 314 inserts regions into different packed video frames simultaneously such that multiple packed video frames are generated at a same time (or within a same time period of each other). In some examples, the example packed video frame information generator 316 examines the packed video frames stored in the packed video frame storage 322 to determine the packed video frame information and, in some examples, the packed video frame generator 314 supplies one or more types of packed video frame information to the packed video frame information generator 316. In some examples, the packed video frame information generator 316 determines an order in which to arrange the packed video frame information in accordance with a video encoding standard.

FIG. 12 is a program 1200 to implement the example decoder verifier 328 of FIG. 3. The example program 1000 of FIG. 10A and FIG. 10B illustrate a manner in which the decoder verifier 328 operates within the context of the encoding system 200 operation. For clarity, the operation of the decoder verifier 328 is not reflected in the program 11 of FIG. 11 and the specificity by which the decoder verifier 328 is not reflected in FIG. 10. Instead the operation of the decoder verifier 328 is described with reference to the program 1200 of FIG. 12. The broader context of how the example program 1200 operates to execute the blocks 1010 and 1012 is illustrated with reference to FIG. 10A and FIG. 10B.

The example program can include a block 1202 at which the example flag setter 333 of FIG. 3 sets flags in the example flag storage 332. Each flag corresponds to a different type of video data, and each flag indicates whether the corresponding type of video data is present in the corresponding packed video frame video unit. The different types of video data include auxiliary video data, occupancy video data, geometry video data, and attribute video data. In some examples, the attribute data can include subcategories of attribute data and the number of subcategories included in the attribute video data is represented using the variable "ai_attribute_count." In addition, the example flag adder 334 sums the number of flags associated with each atlas of the packed video frame unit to determine a total number of the types of video data include in the packed video frame unit. (Block 1204). The sum of the flags is the number of decodes decodable by a decoder that is to receive the encoded video and is equal to a variable "NumDecodes." When the number of flags for all atlases has been summed, an example packed frame video checker 336 checks whether a packed video frame flag indicates that the packed video frame unit includes packed video frames (Block 1206). If the packed video frame video flag does not indicate that the packed video frame unit includes pack video frames, the program 1200 ends. Provided that the packed video frame video flag indicates that the packed video frame video unit includes packed video frames, for each packed video frame, the example region deductor 338 deducts from the value of NumDecodes the number of regions included in each packed video frame until the regions of all packed video frames have been deducted (Block 1208). The number of regions included in each packed video frame minus 1 can be represented by the variable "pi_num_rect[k]−1," where the variable "k" represents a number of a packed video frames included in the total number of packed video frames. Next, the example comparator 340 compares the value of NumDecodes to a value corresponding to a maximum number of decodes that a receiving decoder is able to decode. (Block 1210). The maximum number of decodes is represented by the variable. "MaxDecodes," (also referred to as a threshold). In some examples, the frame packer 218 is preprogrammed with information that identifies, for various types of decoders to which the video stream may be transmitted, a corresponding MaxDecodes value.

If the maximum number of decodes (also referred to as a threshold) is exceeded (e.g., the threshold is not satisfied) as determined at Block 1212), the corresponding video is not encoded and the program 1200 ends.

If the threshold is satisfied (as determined at the block 1212), the encoder proceeds with the generation of packed video frames (Block 1214), and the program 1200 ends. In some examples, the pseudocode of FIG. 13 can be used to implement the program 1200 or replace the program 1200 of FIG. 12. The purpose of the program 1200 of FIG. 12 is to determine the number of video decodes needed to decode the bitstream. For all atlases, if a particular component type is present, it is added. Then, if packing is used, the # of regions minus 1 can be subtracted from the total number of decodes, because the entire packed frame requires only one decoder, regardless of how many regions it contains.

FIG. 14 is a program to 1400 implement the example packed video frame decoder 600 of FIG. 6. In some examples, the program 1400 includes a block 1402 at which example demultiplexer 702 of FIG. 7 receives and demultiplexes an encoded video bitstream stream generated by the encoding system 200 of FIG. 2 (Block 1402). In addition, at the block 1402, the demultiplexer 702 separates the metadata/SEI messages from the encoded video sub-bitstreams and supplies the metadata/SEI messages to the example metadata/SEI message extractor 716. In addition, the demultiplexer 702 supplies the encoded video sub-bitstreams and packed video frame information corresponding to the metadata/SEI messages to the example video stream parser 604.

In some examples, the example video stream parser 704 uses information supplied by the example metadata/SEI message decoder 718 to identify units of the sub-bitstream that correspond to packed video frame frames and to identify information corresponding to the packed video frame frames. In addition, the video stream parser 704 parses packed video frame information from an encoded packed video sub-bitstream received from an encoder. (Block 1404). In some examples, the information of the metadata/SEI message decoder 718 includes, for each packed video frame, a color component index, a bitdepth, a pack width, and a pack height. In addition, the metadata/SEI message decoder 718 supplies a number of map streams associated with the packed video frame and obtains, if needed, the map count associated with one or more packed video frame currently being operated on.

In some examples, the example decoding process 1200 includes using the video stream parser 704 to parse the packed frame video information from the bitstream. (Block 1404). In some examples, the video stream parser 704 associates the packed video frame information a set of variables that describe the packed video frames including: 1) "decPackFrame[frameIdx][compIdx][y][x]"), 2) "decPackBitdepth[frameIdx]," 3) "decPackWidth[frameIdx]" and 4) "decPackHeight[frameIdx]," and 5) "mapIdx." The value represented by the variable "frameIdx" is the index of the decoded packed video frame, the value represented by the variable "compIdx" is the color component index. The variable "y" is a row index in the packed video frame and is in the range of 0 to the value represented by the variable "decPackHeight[frameIdx]−1," inclusive, and the variable "x" is a column index in the packed video frame and is in the range of 0 to "decPackWidth[frameIdx]−1," inclusive. The value of the map index ("mapIdx) falls within a range that begins at zero and extends to the value to which the following statement evaluates: "vps_multiple_map_streams_present_flag?vps_map_count_minus1: 0," inclusive. In some examples, the statement above evaluates to the value of the variable "vps_mpa_count_minus 1" when the value of the variable "vps_multiple_map_streams_present_flag," is true (or not equal to zero), and otherwise evaluates to zero. The variable "vps_map_count_minus1" is a value representing the number of maps included or otherwise associated with a packed video frame currently being operated on.

The decoded packed video frames supplied to the example frame decoder 608. And the decoded packed video information is supplied to the frame parser. The frame decoder 608 performs any decoding process on the packed video frame stream in accordance with any video decoding standard and supplies the resulting decoded packed video frame unit(s) to the example frame unpacker 610 (Block 1406). The packed video frame unpacker 610 unpacks the packed video frame unit using packed video frame information associated with the decoded packed video frames, the variables identified by the video stream parser 604, etc., to unpack the decoded packed video frames. (Block 1408).

The example frame mapper uses the decoded packed video stream and the unpacked frame information to map the regions of the decoded packed video stream to a volumetric video sequence (Block 1410). The mapped video is supplied to a stream to the example reconstructor 712 (see FIG. 7) which uses the information to perform any additional processing needed to reconstruct the three dimensional image (Block 1412) for display at the example renderer. (Block 1414).

FIG. 15 is a program 1500 that can be used to implement the example frame unpacker of FIG. 8. In some examples, the program 1500 begins at a block 1502 at which the metadata/SEI message decoder 618 decodes metadata (including the packed video frame information) and SEI messages generator by the frame packer of the example encoder. The metadata/SEI messages can include packed video frame information associated with the packed video frame unit(s) to be unpacked, an atlas data header corresponding to the packed video frame unit, decoded patch units of the packed video frame unit, a decoded block-to-patch map, etc. The information of the metadata/SEI message decoder 618 can be supplied to the frame unpacker as needed or as requested by the frame unpacker.

In some examples, the example packed video frame unit fetcher 704 receives and/or fetches (from the frame decoder 608) a packed video frame unit to be processed (Block 1504). In some examples, for each region of each packed video frame, information describing each region is collected from the metadata/SEI message decoder as described above with respect to FIG. 7. (Block 1508). For each block of each rect, determine a position and obtain corresponding information as described above with respect to FIG. 7. (Block 1510). Supply block position, corresponding block information and raw data to the reconstructor for placement in an image as described above with respect to FIG. 7. (Block 1512). Repeat block 1508, 1510 and 1512 until all blocks of all regions of all packed video frames have been processed. (Block 1514). Thereafter the program 1500 ends. In some examples, the program 1500 can be implemented using the pseudocode of FIG. 9.

Figure 16:
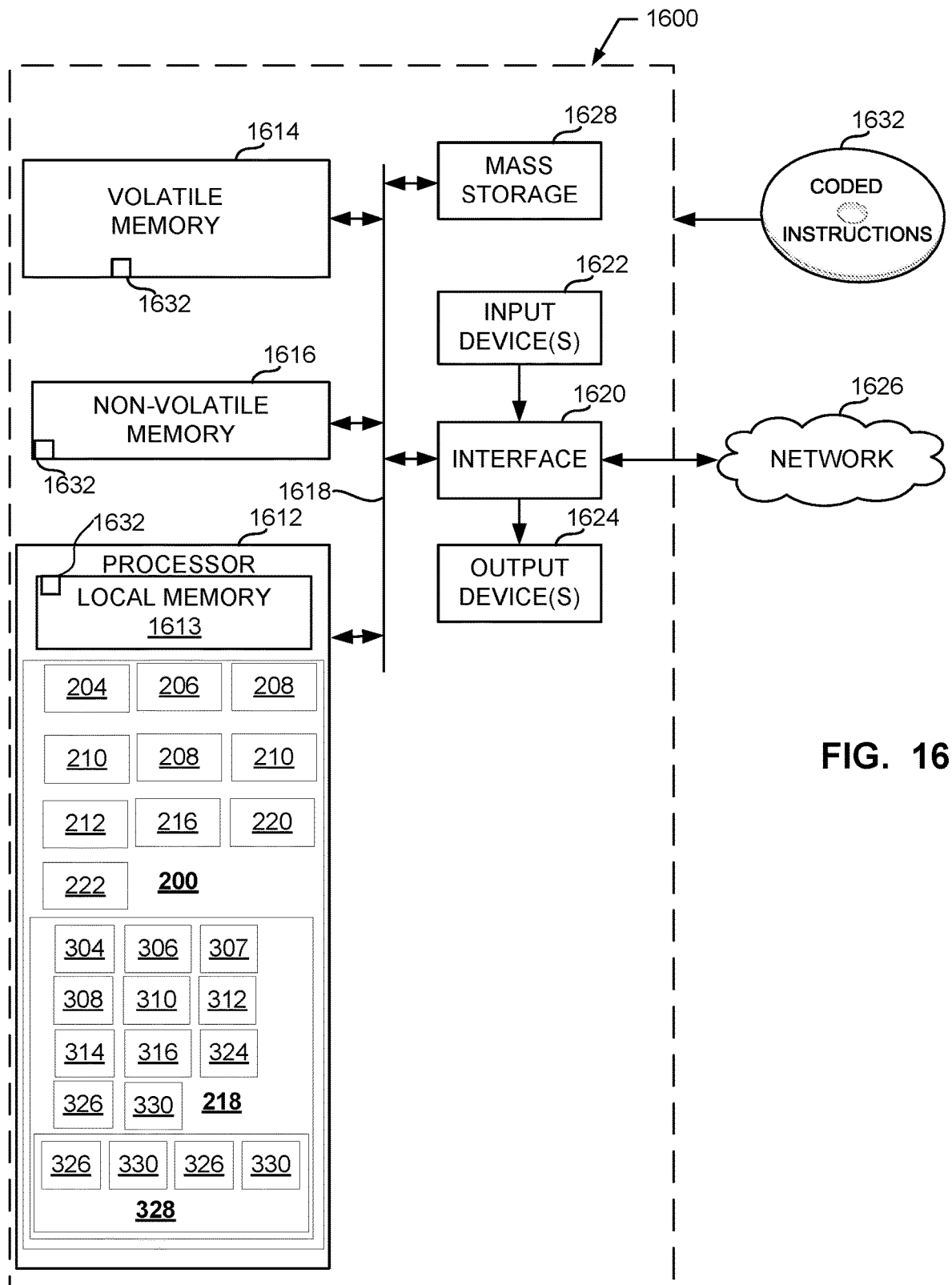
FIG. 16 is a block diagram of an example processing platform structured to execute the instructions of FIGS. 10A, 10B, 11, and 12 to implement the example encoder.

FIG. 16 is a block diagram of an example processor platform 1600 structured to execute the instructions of FIGS. 10A, 10B, 11, 12 to implement the encoder of FIG. 2 and FIG. 3. The processor platform 1600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example video and metadata pre-processor 204, the example parameter/atlas data supplier 206, the example geometry video data supplier 208, the example attribute video data supplier 210, the example occupancy video data supplier 212, the example bitstream formatter 216, the example frame packer 218, the example encoder 220 and the example multiplexer 222, the example packed video frame video flag setter 304, the example packed video frame configuration selector 306, the example atlas identifier 307, the example geometry region generator 308, the example attribute region generator 310, the example occupancy region generator 312, the example packed video frame generator 314, the example packed video frame information generator 316, the example metadata supplier 324, the example packed video frame supplier 326, the example decoder verifier 328, the example evaluator 330, the example flag setter 333, the example flag adder 334, the example packed video frame video checker 336, the example region deductor 338, and the example comparator 340, and/or, more generally, the example encoding system 200.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a virtual reality headset, etc. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives.

The machine executable instructions 1632 of FIGS. 10A, 10B, 11, and 12 may be stored in the mass storage device 1628, in the volatile memory 1614, in the non-volatile memory 1616, and/or on a removable non-transitory computer readable storage medium such as a CD or DVD.

Figure 17:
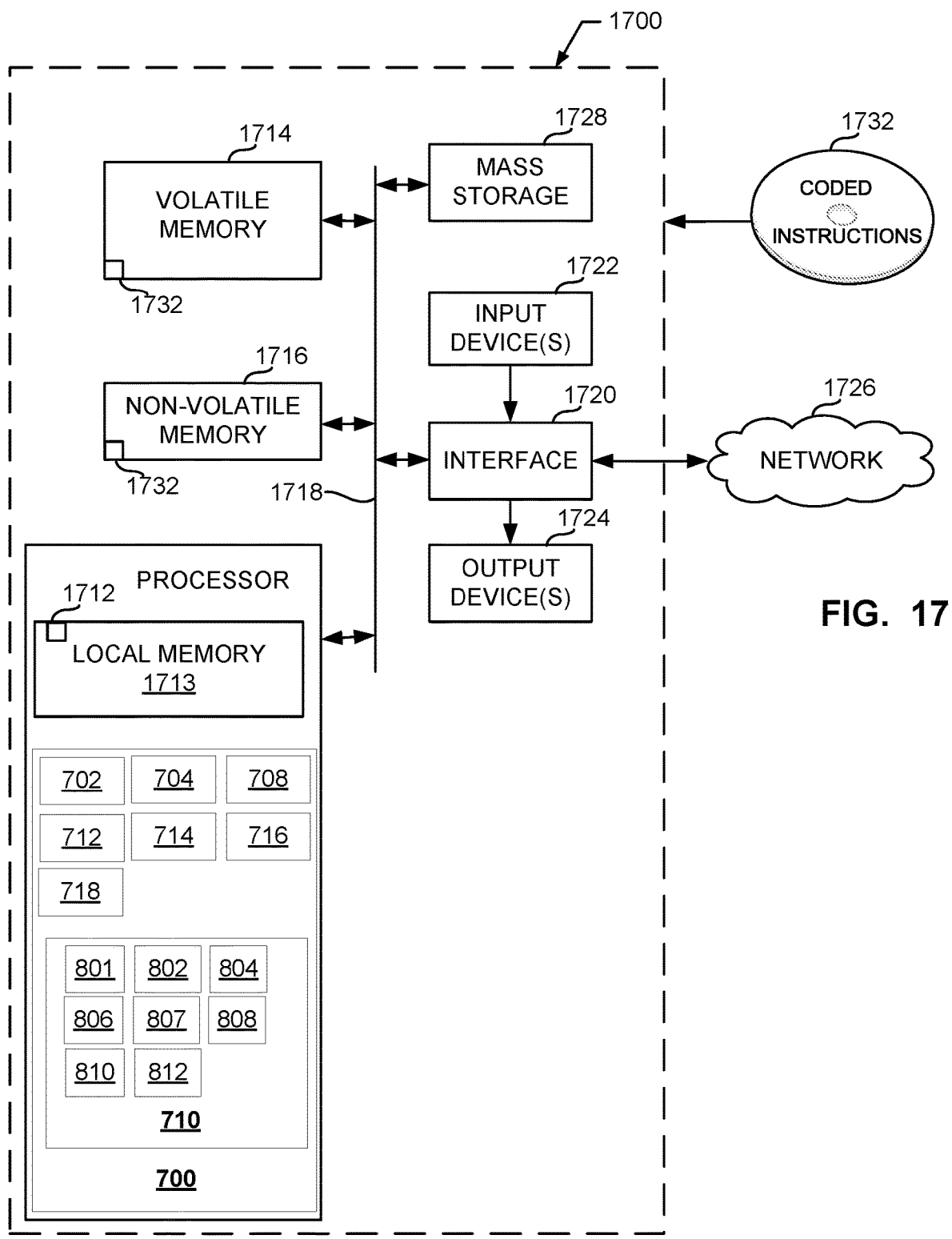
FIG. 17 is a block diagram of an example processing platform structured to execute the instructions of FIGS. 14, and 15 to implement the example decoder.

FIG. 17 is a block diagram of an example processor platform 1700 structured to execute the instructions of FIGS. 14 and 15 to implement the decoder of FIG. 7 and FIG. 8. The processor platform 1700 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset or other wearable device, a virtual reality system, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example demultiplexer 702, the example packed video frame video stream parser 704, the example frame decoder 708, the example frame unpacker 710, the example reconstructor 712, the example renderer 714, the example metadata/SEI message extractor 716, and the example metadata/SEI message decoder 718, the example region counter 801, the example variable value setter 802, the example packed video frame unit fetcher 804, the example region type determiner 806, the example region selector 807, the example region extractor 808, the example region height and region width incrementer 810, the example region positioning determiner 812, and the example mapper 814.

The processor 1712 of the illustrated example includes a local memory 1713 (e.g., a cache). The processor 1712 of the illustrated example is in communication with a main memory including a volatile memory 1614 and a non-volatile memory 1716 via a bus 1718. The volatile memory 1714 may be implemented by Synchronous Dynamic Random-dom Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a virtual reality headset, etc. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives.

The machine executable instructions 1732 of FIG. 14 and FIG. 15 may be stored in the mass storage device 1728, in the volatile memory 1714, in the non-volatile memory 1716, and/or on a removable non-transitory computer readable storage medium such as a CD or DVD.

From the foregoing, it will be appreciated that example methods, apparatus and articles of manufacture have been disclosed that generate data packed video frames for an immersive video bitstream. The disclosed methods, apparatus and articles of manufacture improve the efficiency of using a computing device by reducing a number of decoders needed to decode a video frame thereby enlarging the pool of devices capable of decoding the video frame. Additionally, the methods, apparatus and articles of manufacture disclosed herein also allow different components of the same or different atlases to be included within a same "packed video frame," and the components may be coded at different frame rates (e.g. packed video frame of textures atlases can be sent @60 fps while pack video frames of geometry atlases may be sent at 30 fps) to achieve further compression or support desired features depending on the applications. Additionally, the invention allows the use of standard encoders and decoders to operate on volumetric video data and/or immersive data without required such the encoders or decoders be modified. The disclosed methods, apparatus and articles of manufacture are accordingly directed to one or more improvement(s) in the functioning of a computer.

Example methods, apparatus, systems, and articles of manufacture to generated packed video frames for a volumetric video bitstream and an immersive video bitstream are disclosed herein.

Further examples and combinations thereof include the following:

Example 1 includes a volumetric video encoding system having a configuration determiner to create a packed video frame layout, the packed video frame layout includes regions into which video components are to be placed, and a packed video frame generator to form packed video frames that include the video components placed into different ones of the regions of the packed video frame layout. Additionally included is a packed video frame information generator to generate packed video frame information identifying characteristics of the packed video frame including at least one of (i) the identities of regions included in the packed video frame layout, (ii) respective types of video components included in respective ones of the regions, or iii) the information identifying the locations and dimensions of the regions. The volumetric video encoding system also includes a video encoder to encode the packed video frames in an encoded bitstream. The encoded bitstreams includes the packed video frame information and the packed video frame information signals the inclusion of the packed video frames in the encoded bitstream.

Example 2 includes the volumetric video encoding system of example 1, wherein the types of video components include at least one of auxiliary data, attribute data, geometry data, or occupancy data.

Example 3 includes the volumetric video encoding system of example 1, wherein the regions of the packed video frame are non-overlapping, and the packed video frame information further includes information identifying respective types of video components associated with respective ones of the regions, and at least one of an atlas identifier or an atlas tile identifier.

Example 4 includes the volumetric video encoding system of example 1, wherein the volumetric video data in a same packed video frame has the same sampling format and bitdepth.

Example 5 includes the volumetric video encoding system of example 1, further including a number of decoders verifier to verify that a constraint on a number of decoders to be used to decode the bitstream is not violated.

Example 6 includes the volumetric video encoding system of example 1, further including an independently decodable region identifier, to identify (i) regions of the packed video frame that can be decoded independently and (ii) corresponding region identifiers, a message generator to generate a message including the region identifiers and indicating that the regions corresponding to the region identifiers can be decoded independently, and a multiplexer to multiplex the message with the encoded bitstream for transmission to a decoder.

Example 7 includes one or more non-transitory computer readable medium having instructions that, when executed by at least one processor, cause the at least one processor to at least create a packed video frame layout. The packed video frame layout includes regions into which video components are to be placed. In addition, the processor forms packed video frames that include the video components placed into different ones of the regions of the packed video frame layout and generates packed video frame information identifying characteristics of the packed video frame including at least one of (i) the identities of regions included in the packed video frame layout, (ii) respective types of video components included in respective ones of the regions, or iii) information identifying the locations and dimensions of the regions. The processor also encodes the packed video frames in an encoded bitstream that includes packed video frame information. The packed video frame information signals the inclusion of the packed video frames in the encoded bitstream.

Example 8 includes the one or more non-transitory computer readable medium of example 6, wherein the types of video components include at least one of auxiliary data, attribute data, geometry data, or occupancy data.

Example 9 includes the one or more non-transitory computer readable medium of example 6, wherein the regions of the packed video frame are non-overlapping, and the packed video frame information further includes information identifying respective video component types associated with respective ones of the regions, and at least one of an atlas identifier or an atlas tile identifier.

Example 10 includes the one or more non-transitory computer readable medium of example 6, wherein the volumetric video data placed into a same packed video frame has the same sampling format and bitdepth.

Example 11 includes the one or more non-transitory computer readable medium of example 6, further including a number of decoders verifier to verify that a constraint on a number of decoders to be used to decode the bitstream is not violated.

Example 12 includes the one or more non-transitory computer readable medium of example 6, wherein the instructions, when executed, further cause the processor to identify (i) regions of the packed video frame that can be decoded independently and (ii) corresponding region identifiers and to generate a message including the region identifiers and indicating that the regions corresponding to the region identifiers can be decoded independently. The instructions also cause the processor to multiplex the message with the encoded bitstream for transmission to a decoder.

Example 13 includes the one or more non-transitory mediums of example 6, wherein the instructions, when executed, cause the at least one processor to identify regions of the packed video frame that can be decoded independently, generate a message identifying the regions of the packed video frame to be decoded independently, and multiplex the message with the encoded bitstream for transmission to a decoder.

Example 15 includes a volumetric video decoding system having a parser to extract packed video frame information from a sub-bitstream containing a packed video frame. The packed video frame information includes (i) a packed video frame layout, (ii) region identifiers to uniquely identify regions of the packed video frame layout, and (iii) region location and dimension information. A video decoder to decode the packed video frame of the sub-bitstream is also included as well as a mapper to, based on the packed video frame information, map the regions of the packed video frame to at least a portion of a volumetric video sequence to be rendered.

Example 16 includes the volumetric video decoding system of example 15, wherein respective ones of the regions include respective video component types, the video component types to include at least one of auxiliary data, attribute data, geometry data, or occupancy data.

Example 17 includes the volumetric video decoding system of example 15, wherein the regions of the packed video frame are non-overlapping, and the packed video frame information further includes information identifying respective video component types associated with respective ones of the regions, and at least one of an atlas identifier or an atlas tile identifier.

Example 18 includes the volumetric video decoding system of example 15, wherein the parser is further to extract a message from the sub-bitstream, the message to include supplemental enhancement information having region identifiers, regions corresponding to the region identifiers to be coded independently.

Example 19 includes the volumetric video decoding system of example 18, wherein a size and a location of a region to be coded independently is determined based on a tile index included in the packed video frame information.

Example 20 includes the volumetric video decoding system of example 18, wherein a size and a location of a region to be coded independently is determined based on a sub-picture identifier included in the packed video frame information.

Example 21 includes a volumetric video decoding system, the volumetric video decoding system has a video bitstream parser to parse a parameter set associated with a video bitstream. The parameter set indicates a number of video decoders to be used to decode the bitstream. A decoder verifier determines, based on a profile, tier and level associated with the volumetric video decoding system, whether a plurality of video decoders of the volumetric video decoding system is greater than or equal to the number of decoders indicated by the parameter set. Additionally, a decode controller halts decoding of the sub-bitstream when the plurality of video decoders is less than the number of decoders indicated by the parameter set and continues decoding the sub-bitstream when the plurality of video decoders is greater than or equal to the number of decoders indicated by the parameter set.

Example 22 includes a method to decode volumetric video, that includes extracting packed video frame information from a sub-bitstream containing a packed video frame. The packed video frame information includes (i) a packed video frame layout, (ii) region identifiers to uniquely identify regions of the packed video frame layout, and (iii) region location and dimension information, decoding the packed video frame of the sub-bitstream, mapping, based on the packed video frame information, the regions of the packed video frame to at least a portion of a volumetric video sequence to be rendered.

Example 23 includes the volumetric video decoding method of example 22, wherein respective ones of the regions include respective video component types, and the video component types to include at least one of auxiliary data, attribute data, geometry data, or occupancy data.

Example 24 includes the volumetric video decoding method of example 22, wherein the regions of the packed video frame are non-overlapping, and the packed video frame information further includes information identifying respective video component types associated with respective ones of the regions, and at least one of an atlas identifier or an atlas tile identifier.

Example 25 includes the volumetric video decoding method system of example 22, wherein the parser is further to extract a message from the sub-bitstream, the message to include supplemental enhancement information having region identifiers, regions corresponding to the region identifiers to be coded independently.

Example 26 includes the volumetric video decoding method of example 22, wherein a size and a location of a region to be coded independently is determined based on a tile index included in the packed video frame information.

Example 27 includes the volumetric video decoding method of example 22, wherein a size and a location of a region to be coded independently is determined based on a sub-picture identifier included in the packed video frame information.

Example 28 is example 1 including any one of examples 2-6.

Example 29 is example 7 including any one of examples 8-13.

Example 30 is example 15 including any one of examples 16-17, 19, and 20.

Example 31 includes example 21 and further includes any one of examples 22-27.

Example 32 includes one or more non-transitory medium comprising instructions that, when executed, cause a processor to perform the method of any one of examples 22-27.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:
1. A volumetric video encoding system comprising:
interface circuitry;
machine readable instructions; and
at least one processor circuit to be programmed based on the machine readable instructions to:
form a packed video frame that includes video components placed into different regions of the packed video frame based on a packed video frame layout, the packed video frame to be a single packed video frame including a first region associated with a first atlas and a second region associated with a second atlas, the second region different from the first region, the second atlas different from the first atlas;
generate packed video frame information identifying characteristics of the packed video frame, the packed video frame information including a first identifier to identify the first atlas associated with the first region of the packed video frame and a second identifier to identify the second atlas associated with the second region of the packed video frame; and encode the packed video frame in an encoded bitstream, the encoded bitstream to include the packed video frame information, the packed video frame information to signal the inclusion of the packed video frame in the encoded bitstream.

2. The volumetric video encoding system of claim 1, wherein the video components include at least one of auxiliary data, attribute data, geometry data, or occupancy data.

3. The volumetric video encoding system of claim 1, wherein the regions of the packed video frame are non-overlapping, and the packed video frame information further includes information identifying respective types of video components associated with respective ones of the regions.

4. The volumetric video encoding system of claim 1, wherein the video components in the packed video frame have a same bit depth.

5. The volumetric video encoding system of claim 1, wherein one or more of the at least one processor circuit is to verify that a constraint on a number of decoders to be used to decode the encoded bitstream is not violated.

6. The volumetric video encoding system of claim 1, wherein one or more of the at least one processor circuit is to:
identify (i) regions of the packed video frame that can be decoded independently and (ii) corresponding region identifiers;
generate a message including the region identifiers and indicating that the regions corresponding to the region identifiers can be decoded independently; and
multiplex the message with the encoded bitstream for transmission to a decoder.

7. One or more non-transitory computer readable media comprising instructions to cause at least one processor circuit to at least:
form a packed video frame that includes video component data placed into different regions of the packed video frame based on a packed video frame layout, the video component data including attribute data, geometry data and occupancy data, the packed video frame to be a single packed video frame having a first region including at least a portion of the attribute data of a first atlas, a second region including at least a portion of the geometry data of the first atlas, and a third region including at least a portion of the occupancy data of the first atlas;
generate packed video frame information identifying characteristics of the packed video frame; and
encode the packed video frame in an encoded bitstream, the encoded bitstream to include the packed video frame information, the packed video frame information to signal the inclusion of the packed video frame in the encoded bitstream.

8. The one or more non-transitory computer readable media of claim 7, wherein the video component data incudes auxiliary data.

9. The one or more non-transitory computer readable media of claim 7, wherein the regions of the packed video frame are non-overlapping, and the packed video frame information further includes information identifying respective video component data types associated with respective ones of the regions.

10. The one or more non-transitory computer readable media of claim 7, wherein the video component data placed into the packed video frame has a same bit depth.

11. The one or more non-transitory computer readable media of claim 7, wherein the instructions are to cause one or more of the at least one processor circuit to verify that a constraint on a number of decoders to be used to decode the encoded bitstream is not violated.

12. The one or more non-transitory computer readable media of claim 7, wherein the instructions are to cause one or more of the at least one processor circuit to:
identify (i) regions of the packed video frame that can be decoded independently and (ii) corresponding region identifiers;
generate a message including the region identifiers and indicating that the regions corresponding to the region identifiers can be decoded independently; and
multiplex the message with the encoded bitstream for transmission to a decoder.

13. The one or more non-transitory computer readable media of claim 7, wherein the instructions are to cause one or more of the at least one processor circuit to:
identify regions of the packed video frame that can be decoded independently;
generate a message identifying the regions of the packed video frame to be decoded independently; and
multiplex the message with the encoded bitstream for transmission to a decoder.

14. A volumetric video decoding system comprising:
interface circuitry;
machine readable instructions; and
at least one processor circuit to be programmed based on the machine readable instructions to:
extract packed video frame information from a bitstream including a packed video frame, the packed video frame information to include information to identify regions of the packed video frame;
decode the regions of the packed video frame based on the packed video frame information, the regions of the packed video frame including a first region, a second region and a third region, the first region of the packed video frame including attribute data of a first atlas, the second region of the packed video frame including geometry data of the first atlas, and the third region of the packed video frame including occupancy data of the first atlas; and
map, based on the packed video frame information, the regions of the packed video frame to at least a portion of a volumetric video sequence to be rendered.

15. The volumetric video decoding system of claim 14, wherein respective ones of the regions include respective video component data types, the video component data types to include an attribute data type, a geometry data type, and an occupancy data type.

16. The volumetric video decoding system of claim 14, wherein the regions of the packed video frame are non-overlapping, and the packed video frame information includes information identifying respective video component data types associated with respective ones of the regions, and at least one of an atlas identifier or an atlas tile identifier.

17. The volumetric video decoding system of claim 14, wherein one or more of the at least one processor circuit is to extract a message from the bitstream, the message to include supplemental enhancement information having region identifiers, ones of the regions corresponding to the region identifiers to be coded independently.

18. The volumetric video decoding system of claim 17, wherein one or more of the at least one processor circuit is to determine a size and a location of a first one of the regions to be coded independently based on a tile index included in the packed video frame information.

19. The volumetric video decoding system of claim 17, wherein one or more of the at least one processor circuit is to determine a size and a location of a first one of the regions to be coded independently based on a sub-picture identifier included in the packed video frame information.

20. A volumetric video decoding method comprising:
extracting, by at least one processor circuit programmed based on at least one instruction, packed video frame information from a bitstream including a packed video frame, the packed video frame information including information to identify regions of the packed video frame;
decoding the regions of the packed video frame based on the packed video frame information, the regions of the packed video frame including a first region and a second region, the first region of the packed video frame associated with a first atlas, the second region of the packed video frame associated with a second atlas, the second atlas different from the first atlas; and
mapping, based on the packed video frame information, the regions of the packed video frame to at least a portion of a volumetric video sequence to be rendered.

21. The volumetric video decoding method of claim 20, wherein respective ones of the regions include respective video component data types, the video component data types to include at least one of an auxiliary data type, an attribute data type, a geometry data type, or an occupancy data type.

22. The volumetric video decoding method of claim 20, wherein the regions of the packed video frame are non-overlapping, and the packed video frame information includes information identifying respective video component data types associated with respective ones of the regions, and at least one of an atlas identifier or an atlas tile identifier.

23. The volumetric video decoding method system of claim 20, including extracting a message from the bitstream, the message including supplemental enhancement information having region identifiers, ones of the regions corresponding to the region identifiers to be coded independently.

24. The volumetric video decoding method of claim 20, including determining a size and a location of a first one of the regions to be coded independently based on a tile index included in the packed video frame information.

25. The volumetric video decoding method of claim 20, including determining a size and a location of a first one of the regions to be coded independently based on a sub-picture identifier included in the packed video frame information.

\* \* \* \* \*